US012772099B2

(12) United States Patent
Zhang

(10) Patent No.: US 12,772,099 B2
(45) Date of Patent: Oct. 20, 2026

(54) PACKET TRANSMISSION METHOD

(71) Applicant: Tencent Technology (Shenzhen) Company Limited, Shenzhen (CN)

(72) Inventor: Zhuoyun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 382 days.

(21) Appl. No.: 18/219,801

(22) Filed: Jul. 10, 2023

(65) Prior Publication Data

US 2023/0354088 A1 Nov. 2, 2023

Related U.S. Application Data

(63) Continuation of application No. PCT/CN2022/135896, filed on Dec. 1, 2022.

(30) Foreign Application Priority Data

Apr. 21, 2022 (CN) ......................... 202210421271.9

(51) Int. Cl.
*H04W 28/02* (2009.01)

(52) U.S. Cl.
CPC ............................... *H04W 28/0268* (2013.01)

(58) Field of Classification Search
CPC ............. H04L 41/0663; H04L 61/4552; H04L 61/5053
USPC .......................................................... 709/224
See application file for complete search history.

(56) References Cited

U.S. PATENT DOCUMENTS

2021/0392539 A1 12/2021 Guo
2023/0019215 A1* 1/2023 Wang .................. H04L 12/1407
2023/0080830 A1* 3/2023 Fernandez Alonso ........................ H04L 12/1407 455/422.1
2023/0247476 A1* 8/2023 Chun .................. H04L 65/1073 370/235
2023/0284323 A1* 9/2023 Saha ................... G06F 11/3698 370/329

(Continued)

FOREIGN PATENT DOCUMENTS

CN 110557786 12/2019
CN 114302426 4/2022

OTHER PUBLICATIONS

International Search Report issued Jan. 28, 2023 in International (PCT) Application No. PCT/CN2022/135896.

(Continued)

*Primary Examiner* — Karen C Tang
(74) *Attorney, Agent, or Firm* — Crowell & Moring LLP

(57) ABSTRACT

A packet transmission method is provided. The method includes: transmitting Quality of Service (QoS) request information to a Policy Control Function (PCF) network element in a request message, the QoS request information comprising sub-QoS flow detection information and sub-QoS information of a sub-QoS flow in a QoS flow; and receiving a response message to the request message, the response message comprising indication information on whether the request message is approved, the QoS request information being for indicating the PCF network element to generate policy and charging control (PCC) rules for the sub-QoS flow upon approval of the request message, and the PCC rules for the sub-QoS flow comprising the sub-QoS flow detection information and the sub-QoS information.

3 Claims, 10 Drawing Sheets

(56) References Cited

U.S. PATENT DOCUMENTS

| | | | | |
|---|---|---|---|---|
| 2024/0015250 | A1* | 1/2024 | Tao | H04M 15/852 |
| 2025/0106291 | A1* | 3/2025 | Luo | H04W 28/10 |
| 2025/0150901 | A1* | 5/2025 | Kim | H04W 28/24 |
| 2025/0156243 | A1* | 5/2025 | Srivastava | H04L 67/1008 |

OTHER PUBLICATIONS

Samsung Clarifications on User Plane Latency Requirement 3GPP TSG-WG SA2 Meeting #145E S2-2104598 May 28, 2021.
Catt; "New Solution for KI#4/5: Sub-QoS Flow based QoS Architecture and Policy Control", 3GPP TSG-WG SA2 Meeting #150E e-meeting, S2-2202715, Apr. 2022, (9 pages).
Catt; "New Solution for KI#4/5: PDU Set Identification and Marking", 3GPP TSG-WG SA2 Meeting #150E e-meeting, S2-2202716, Apr. 2022, (9 pages).
Chinese-language Office Action issued in Chinese Application No. 202210421271.9 dated Aug. 1, 2026, with English translation (24 pages).

* cited by examiner

PACKET TRANSMISSION METHOD

RELATED APPLICATION

This application is a continuation application of PCT Patent Application No. PCT/CN2022/135896, filed on Dec. 1, 2022, which claims priority to Chinese Patent Application No. 202210421271.9 filed on Apr. 21, 2022, wherein the content of the above-referenced applications is incorporated herein by reference in its entirety.

FIELD OF THE TECHNOLOGY

The embodiments of this disclosure relate to the field of communication technologies, and in particular relate to a packet transmission method, a communication device, a computer-readable storage medium, and a computer program product.

BACKGROUND OF THE DISCLOSURE

During network transmission of packets, packets in data flows of certain specific service may have different importance or characteristics. When these packets are transmitted in the same service flow, the data transmission requirements of these packets cannot be met by relevant technologies.

SUMMARY

The embodiments of this disclosure provide a packet transmission method, a communication device, a computer-readable storage medium, and a computer program product, which are capable of meeting diverse data transmission requirements of services, and ensuring the transmission quality of different key packets in the same data flow.

An embodiment of this disclosure provides a packet transmission method performed by an Application Function (AF) network element, and the method includes:

transmitting Quality of Service (QoS) request information to a Policy Control Function (PCF) network element in a request message, the QoS request information comprising sub-QoS flow detection information and sub-QoS information of a sub-QoS flow in a QoS flow; and receiving a response message to the request message, the response message comprising indication information on whether the request message is approved, the QoS request information being for indicating the PCF network element to generate policy and charging control (PCC) rules for the sub-QoS flow upon approval of the request message, and the PCC rules for the sub-QoS flow comprising the sub-QoS flow detection information and the sub-QoS information.

An embodiment of this disclosure provides a packet transmission method performed by a PCF network element, and the method includes:

obtaining Quality of Service (QoS) request information in a request message, the QoS request information comprising sub-QoS flow detection information and sub-QoS information of a sub-QoS flow in a QoS flow;

generating Policy and Charging Control (PCC) rules for the sub-QoS flow upon approval of the request message, the PCC rules for the sub-QoS flow comprising the sub-QoS flow detection information and the sub-QoS information; and transmitting the PCC rules for the sub-QoS flow to a Session Management Function (SMF) network element.

An embodiment of this disclosure provides a packet transmission method performed by an SMF network element, and the method includes:

obtaining Policy and Charging Control (PCC) rules for a sub-Quality of Service (QoS) flow from the Policy Control Function (PCF) network element, and the PCC rules for a sub-QoS flow comprise sub-QoS flow detection information and sub-QoS information of the sub-QoS flow; and generating sub-QoS rules for the sub-QoS flow according to the PCC rules for the sub-QoS flow, and transmitting the sub-QoS rules to a terminal, the sub-QoS rules comprising a sub-QoS Flow Identifier (sub-QFI) of the sub-QoS flow and a packet filter sub-set, the packet filter sub-set comprising the sub-QoS flow detection information; or generating User Plane Function (UPF) data processing instructions according to the PCC rules for the sub-QoS flow, and transmitting the UPF data processing instructions to a UPF network element, the UPF data processing instructions comprising the sub-QFI of the sub-QoS flow and at least one of sub-packet detection rules for the sub-QoS flow and the sub-QoS information, and the sub-packet detection rules comprising the sub-QoS flow detection information.

An embodiment of this disclosure provides a packet transmission method performed by a terminal, and the method includes:

obtaining sub-Quality of Service (QoS) rules for a sub-QoS flow in a QoS flow, the sub-QoS rules comprising a sub-QoS Flow Identifier (QFI) and a packet filter sub-set of the sub-QoS flow, and the packet filter sub-set comprising sub-QoS flow detection information of the sub-QoS flow;

determining whether an uplink packet to be transmitted matches the sub-QoS flow detection information according to the packet filter sub-set;

encapsulating the uplink packet with the sub-QFI; and transmitting the uplink packet encapsulated with the sub-QFI to a network device.

An embodiment of this disclosure provides a packet transmission method performed by a UPF network element, and the method includes:

obtaining UPF data processing instructions of a Quality of Service (QoS) flow from a Session Management Function (SMF) network element, the UPF data processing instructions comprising a sub-QoS flow identifier (QFI) of the sub-QoS flow in the QoS flow and at least one of sub-packet detection rules or sub-QoS information of the sub-QoS flow;

receiving a packet to be forwarded; and processing the packet according to at least one of the sub-QFI, the sub-packet detection rules, or the sub-QoS information.

An embodiment of this disclosure provides a packet transmission method performed by a network device, and the method includes:

obtaining a sub-Quality of Service (QoS) flow identifier (QFI) and a sub-QoS profile of a sub-QoS flow in a QoS flow, the sub-QoS profile comprising sub-QoS information of the sub-QoS flow;

receiving a packet to be forwarded; and processing the packet to be forwarded according to the sub-QoS information in the sub-QoS profile in response to the packet to be forwarded matching the sub-QFI.

An embodiment of this disclosure provides a computer-readable storage medium, configured to store a computer program, the computer program, when run on a computer, enabling the computer to implement the packet transmission method described in the embodiments of this disclosure.

An embodiment of this disclosure provides a computer program product, including a computer program for implementing the packet transmission method described in the embodiment of this disclosure when executed by a computer.

The embodiments of this disclosure have the following beneficial effects: by adding a sub-QoS flow to a QoS flow, when an AF network element transmits QoS request information to a PCF network element, the QoS request information may carry sub-QoS flow detection information and sub-QoS information of the sub-QoS flow in the QoS flow. Therefore, based on the QoS request information carrying the sub-QoS flow detection information and the sub-QoS information, the PCF network element may be indicated to generate PCC rules for the sub-QoS flow, and the PCC rules for the sub-QoS flow may include the sub-QoS flow detection information and the sub-QoS information. Thus, when the QoS flow is used for transmitting packets of a target service flow, and there are target packets with different importance or characteristics in the packets of the target service flow, different data transmission requirements of the target packets in the target service flow can be met by the sub-QoS information corresponding to the sub-QoS flow, thereby ensuring the transmission quality for different key packets in the same data flow.

DESCRIPTION OF EMBODIMENTS

Figure 1:
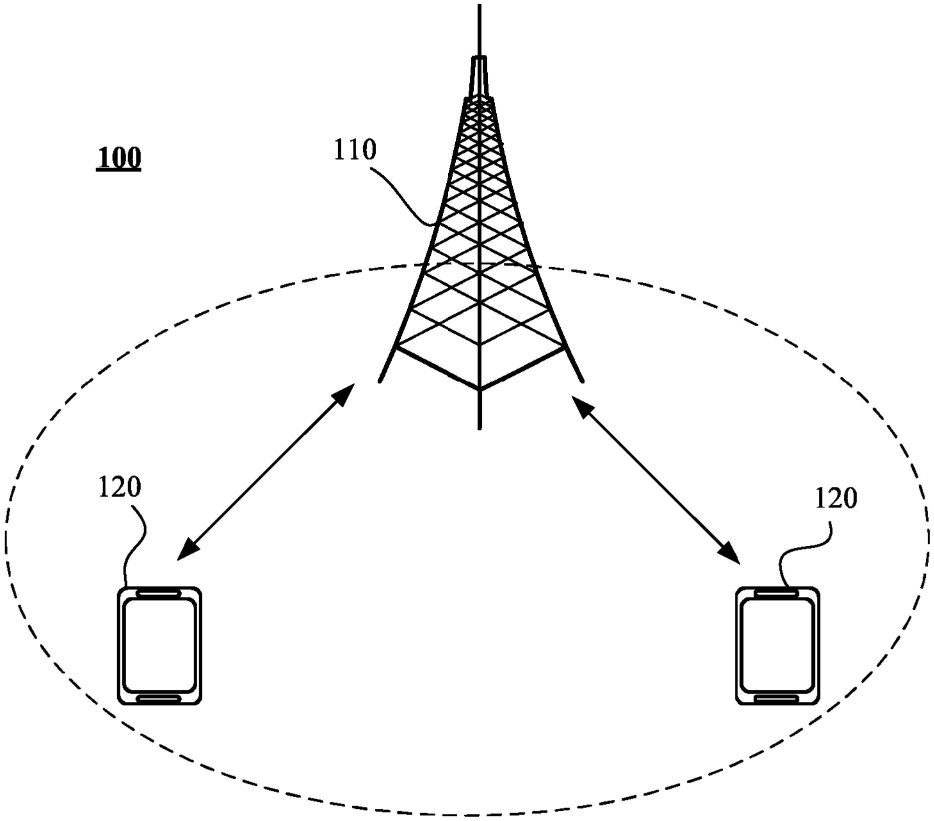
FIG. 1 is a schematic diagram of a communication system architecture according to an embodiment of this disclosure.

In order to make the objectives, technical solutions, and advantages of this disclosure more obvious, the exemplary embodiments according to this disclosure will be described in detail below with reference to the accompanying drawings. Throughout the accompanying drawings, the same reference numerals represent the same components. It is to be understood that the embodiments described here are only illustrative and are not to be construed as limiting the scope of this disclosure.

The technical solutions of the embodiments of this disclosure may be applied to various communication systems, e.g., Global System of Mobile communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunications System (UMTS), Worldwide Interoperability for Microwave Access (WiMAX) communication system, 5G system, future evolving mobile communication system, and the like.

Exemplarily, a communication system 100 applied in this embodiment of this disclosure is shown in FIG. 1. The communication system 100 may include a network device 110 that communicates with a terminal 120 (also known as a communication terminal, or a terminal). The network device 110 may provide communication coverage for a specific geographical area and may communicate with a terminal in the coverage area. For example, the network device 110 may be a Base Transceiver Station (BTS) in a GSM or CDMA system, NodeB (NB) in a WCDMA system, Evolutional NodeB (eNB or eNodeB) in an LTE system, base station in a 5G communication system, or wireless controller in a Cloud Radio Access Network (CRAN). Or, the network device may be a mobile switching center, a relay station, an access point, an onboard device, a wearable device, a hub, a switch, a bridge, a router, a network side device in a 5G network, a network device in a future evolving Public Land Mobile Network (PLMN), or the like.

The communication system 100 further includes at least one terminal 120 in the coverage area of the network device 110. The "terminal" used herein includes, but is not limited to, connection via a wired line, e.g., connection via at least one of the following modes: Public Switched Telephone Network (PSTN), Digital Subscriber Line (DSL), digital cable, and direct cable connection; another data connection/network; via wireless interfaces, e.g., cellular network, Wireless Local Area Network (WLAN), digital television network such as DVB-H network, satellite network, and AM-FM broadcast transmitters; a device set to receive/transmit communication signals at another terminal; and Internet of Things (IoT) devices. A terminal set to communicate via a wireless interface may be referred to as a "wireless communication terminal", "wireless terminal", or "mobile terminal". Examples of mobile terminals include, but are not limited to, satellite or cellular phones; Personal Communications System (PCS) terminals that may combine cellular radiotelephones with data processing, fax, and data communication capabilities; Personal Digital Assistant (PDA) that may include radiotelephones, pagers, internet/intranet access, Web browsers, notebooks, calendars, and Global Positioning System (GPS) receivers; and conventional laptop or handheld receivers or other electronic devices including radiotelephone transceivers. A terminal may refer to an access terminal, User Equipment (UE), user unit, user station, mobile station, mobile platform, remote station, remote terminal, mobile device, user terminal, terminal, wireless communication device, user agent or user device. An access terminal may be a cellular phone, cordless telephone, Session Initiation Protocol (SIP) phone, Wireless Local Loop (WLL) station, PDA, handheld device with wireless communication functions, computing device or other processing devices connected to wireless modem, on-board device, wearable device, terminal in a 5G network, terminal in a future evolving PLMN, or the like.

In this embodiment of this disclosure, Device to Device (D2D) communication may be carried out between different terminals 120. FIG. 1 illustrates an example of a network device and two terminals. The communication system 100 may include multiple network devices, and the coverage area of each network device may include other numbers of terminals, which are not limited in the embodiments of this disclosure.

In some embodiments, the communication system 100 may further include a Policy Control Function (PCF) network element, an access mobility management function network element, and other network elements. It is to be understood that a device with a communication function in the network/system in this embodiment of this disclosure may be referred to as a communication device. Taking the communication system 100 shown in FIG. 1 as an example, the communication device may include the network device 110 and the terminals 120 with communication functions, and the network device 110 and the terminals 120 may be the devices described above.

It is to be understood that the terms "system" and "network" in the embodiments of this disclosure are often interchangeably used.

Figure 2:
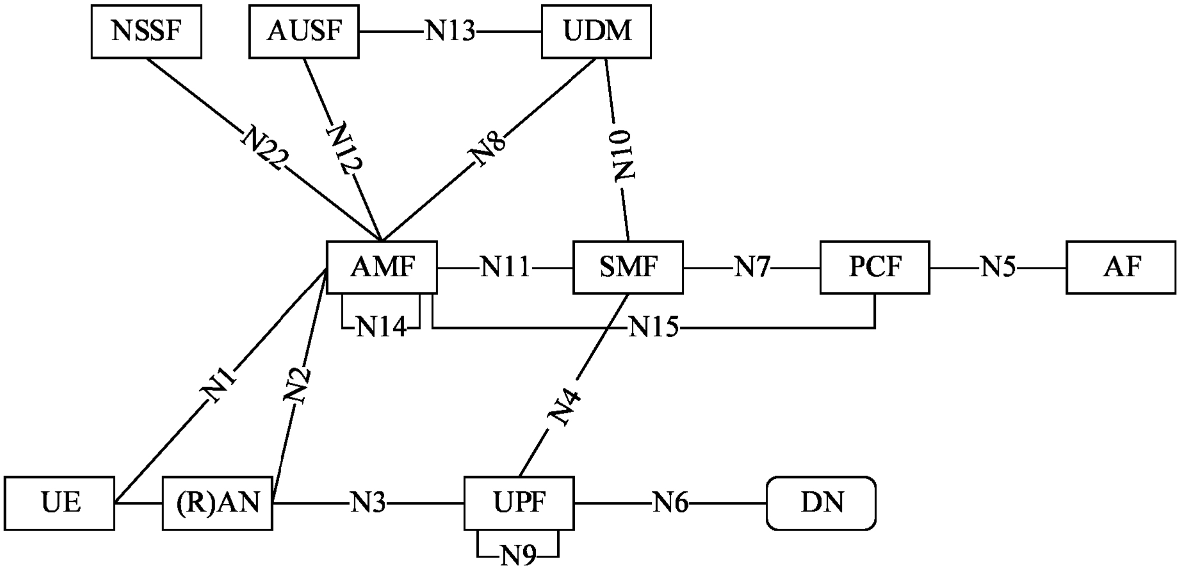
FIG. 2 is a system architecture diagram of a 5G network according to an embodiment of this disclosure.

FIG. 2 is a system architecture diagram of a 5G network according to an embodiment of this disclosure. As shown in FIG. 2, the devices involved in the 5G network system include: a terminal (UE), a Radio Access Network (RAN), a User Plane Function (UPF) network element, a Data Network (DN), an Access and Mobility Management Function (AMF) network element, a Session Management Function (SMF) network element, a Policy Control Function (PCF) network element, an Application Function (AF) network element, an Authentication Server Function (AUSF) network element, and a Unified Data Management (UDM) network element.

Figure 3:
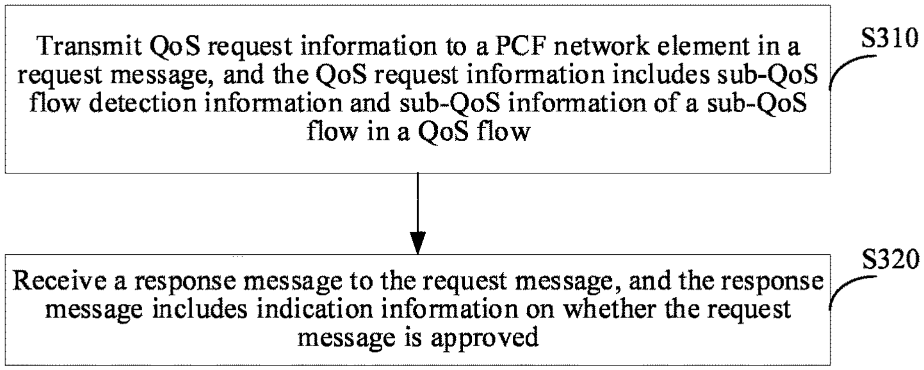
FIG. 3 is a flowchart of a packet transmission method according to an embodiment of this disclosure.

FIG. 3 schematically illustrates a flowchart of a packet transmission method according to an embodiment of this disclosure. The method provided in the embodiment of FIG. 3 may be performed by the AF network element, which is not limited in this embodiment of this disclosure.

As shown in FIG. 3, the method provided in this embodiment of this disclosure may include steps S310 and S320.

In S310, Quality of Service (QoS) request information is transmitted to a PCF network element through a request message, and the QoS request information includes sub-QoS flow detection information and sub-QoS information of a sub-QoS flow in a QoS flow.

In this embodiment of this disclosure, the AF network element may directly or indirectly transmit the QoS request information to the PCF network element through the request message. The QoS request information refers to QoS requirement information proposed by the AF network element to the PCF network element for target packets with different importance or characteristics in a target service flow during network transmission, and may also be referred to as service requirement information.

In this embodiment of this disclosure, the target service flow refers to the service flow formed by transmission of packets from at least one of terminals and service servers in the network for a certain or some target services. The target service may be set according to actual needs. The target service may be a specific service, e.g., Augmented Reality (AR), and Virtual Reality (VR). The target packets in the data flow of the target service may have different importance. For example, the target packet may correspond to key image data information in the target service, or the target packet may correspond to control information in the target service. Or, the target packets in the data flow may have different characteristics, for example, the target service flow is a multimedia service flow, or the target packets transmitted by the multimedia service flow may be videos, subtitles, audios, or the like.

In this embodiment of this disclosure, a sub-QoS flow is added to a QoS flow of a target service flow. The sub-QoS flow may be used for transmitting a group of target packets with the same importance or characteristics in the target service flow, and the target packets in the sub-QoS flow have different importance or characteristics from other packets belonging to the QoS flow but not belonging to the-sub-QoS flow, thereby meeting the QoS requirements of the target packets in the target service flow. The sub-QoS flow has corresponding sub-QoS flow detection information and sub-QoS information. One QoS flow may have one or more sub-QoS flows.

The sub-QoS flow detection information refers to information that may be used for identifying whether packets belonging to the same target service flow within the QoS flow belong the sub-QoS flow. In an exemplary embodiment, the sub-QoS flow detection information may include at least one of the size of the packet of the sub-QoS flow and sub-QoS flow packet mark information.

In some embodiments, the sub-QoS flow detection information may include the size of the packet of the sub-QoS flow. The value of the size of the packet may be set according to actual service requirements, and the size of the packet may be in a range or may be a determined value. In some embodiments, the sub-QoS flow detection information may include sub-QoS flow packet mark information which may be used for marking target packets belonging to the sub-QoS flow. For example, the sub-QoS flow packet mark information may be specific mark information on an Internet Protocol (IP) header of the target packet or on the packet header of the target packet. In other embodiments, the sub-QoS flow detection information may include the size of the packet of the sub-QoS flow and the sub-QoS flow packet mark information.

In an exemplary embodiment, the sub-QoS information may be used for setting the QoS requirements of a group of target packets with the same importance or characteristics in the target service flow, and the group of target packets have different importance or characteristics from the packets not belonging to the group. In this embodiment of this disclosure, the sub-QoS information may include at least one of the scheduling precedence, bit error rate, transmission delay and the like of the target packets of the sub-QoS flow.

For example, when the target service flow is a multimedia service flow, a sub-QoS flow may be set for transmitting video frames in the multimedia service flow, and the sub-QoS flow for transmitting video frames has a feature that the size of the packet is greater than a packet threshold; another sub-QoS flow may be set for transmitting audio frames in the multimedia service flow, and the packet of the sub-QoS flow for transmitting audio frames is to be smaller than the packet of the sub-QoS flow of the video frames; and another sub-QoS flow may be set for transmitting subtitle data in the multimedia service flow, and the packet of the sub-QoS flow for transmitting subtitle data is to be smaller than the packet of the audio frames.

The target packets corresponding to the sub-QoS flows with different sizes of the packets may have different levels of importance. For example, in the multimedia service flow, the target packets corresponding to the video frames may be set to be more important. Therefore, the sub-QoS information of the corresponding sub-QoS flow may include at least one of the following: higher scheduling precedence, lower bit error rate, lower transmission delay, and the like.

For another example, when a specific sub-QoS flow for transmitting target packets and an ordinary sub-QoS flow for transmitting non-target packets are distinguished according to the size of the packet of the sub-QoS flow, more fine-grained sub-QoS flow packet mark information may be used for distinguishing the specific sub-QoS flow. For example, the packet type is specified in the IP header or packet header of the target packet, e.g., video frames may be divided into I frames (intraframe coding frames), P frames (forward predictive coding frames), and B frames (bidirectional predicted interpolative coding frames). The I frames, B frames and P frames may be set as different sub-QoS flows respectively. For the sub-QoS flow of the key frames of the I frames, which has a higher level of importance, a lower bit error rate may be set in the sub-QoS information of the corresponding sub-QoS flow. For example, the value of the bit error rate may be 10-3 or 10-4. Or higher scheduling precedence or a lower transmission delay may be set.

When the target packets and ordinary packets (i.e. the packets of the target service flow other than the target packets) with different importance or characteristics are transmitted in the same target service flow, in this embodiment of this disclosure, the QoS request information carries the sub-QoS flow detection information and sub-QoS information of the sub-QoS flow in the QoS flow. The sub-QoS information of the corresponding sub-QoS flow may be set to have a lower bit error rate to give priority to ensuring that such key target packets have a lower packet error rate. Or the sub-QoS information of the corresponding sub-QoS flow may have at least one of higher scheduling precedence and a lower transmission delay, to give priority to ensuring that the transmission precedence of such key target packets is greater than a precedence threshold, and the like, thus ensuring the quality of network transmission of the key target packets of the target service in the same target service flow. Distinguishing the sub-QoS flows according to the size of the packet, and setting the target packets of different sizes with varying levels of importance or characteristics, is a coarse-grained division method that may reduce the detection difficulty and improve the detection efficiency. Distinguishing the sub-QoS flows according to the sub-QoS flow packet mark information may achieve more fine-grained division, achieve more accurate detection, and meet the more diverse requirements of service data transmission.

In S320, a response message for the request message is received, and the response message includes indication information on whether the request message is approved.

The QoS request information is used for indicating the PCF network element to generate PCC rules for the sub-QoS flow upon approval of the request message, and the policy and charging control rules for the sub-QoS flow includes the sub-QoS flow detection information and the sub-QoS information.

In this embodiment of this disclosure, after receiving the QoS request information, a PCF network element may generate PCC rules for the corresponding sub-QoS flow of the target service flow according to the sub-QoS flow detection information and sub-QoS information of the sub-QoS flow in the QoS flow carried by the QoS request information. The PCC rules for the sub-QoS flow may be included in the PCC rules for the target service flow or independent of the PCC rules for the target service flow. The PCC rules for the sub-QoS flow may include the sub-QoS flow detection information (hereinafter referred to as sub-template information) of the aforementioned sub-QoS flow, and the sub-QoS information (hereinafter referred to as the QoS requirement information corresponding to the sub-template) corresponding to the sub-QoS flow (hereinafter referred to as the sub-template), and the like.

According to the packet transmission method provided in this embodiment of this disclosure, by adding a sub-QoS flow to a QoS flow, when an AF network element transmits Qos request information to a PCF network element, the QoS request information may include sub-QoS flow detection information and sub-QoS information of the sub-QoS flow in the QoS flow, to indicate the PCF network element to generate PCC rules for the sub-QoS flow according to the QoS request information, and the PCC rules for the sub-QoS flow may include the sub-QoS flow detection information and the sub-QoS information. Thus, when the QoS flow is used for transmitting packets of the target service flow, and there are target packets with different importance or characteristics in the packets of the target service flow, different data transmission requirements of the target packets in the target service flow may be met by the sub-QoS information corresponding to the sub-QoS flow.

FIGS. 4 to 11 illustrate schematic diagrams of AF interaction service requirements.

Figure 4:
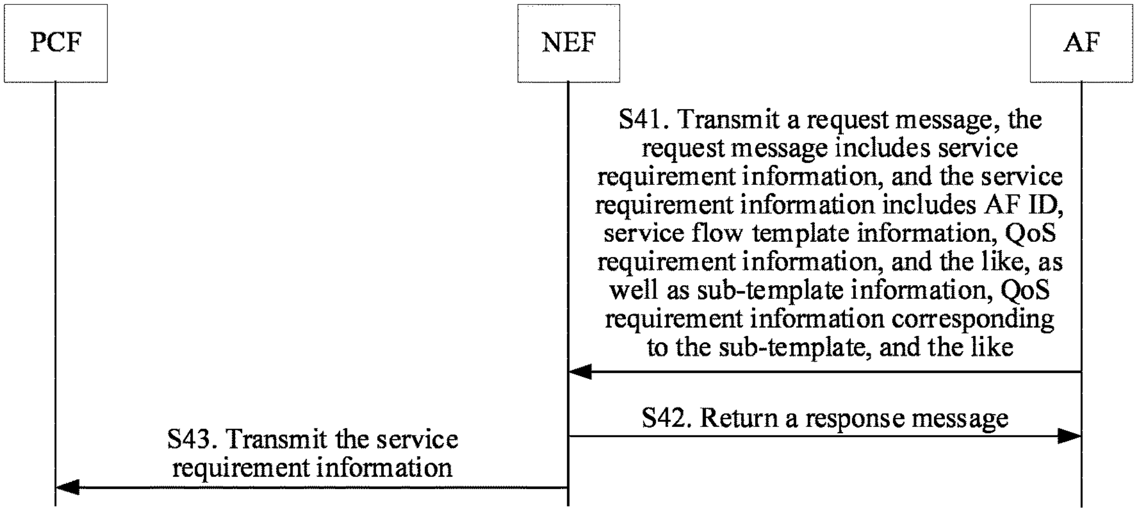
FIG. 4 is an interaction schematic diagram of a packet transmission method according to an embodiment of this disclosure.

As shown in FIG. 4, the method provided in this embodiment of this disclosure may include steps S41 to S43.

In S41, the AF network element transmits a request message to a Network Exposure Function (NEF) network element. The request message may include service requirement information which may include AF identifier information (represented by AF ID below), service flow template information, QoS requirement information (the QoS requirement information here refers to the QoS requirement information of other ordinary sub-QoS flows in the target service flow than the sub-QoS flow below with specific service transmission requirements, for example, the scheduling precedence, bit error rate, bandwidth, transmission delay and other information of the ordinary sub-QoS flows, and compared with the specific sub-QoS flow, the ordinary sub-QoS flows may be set with lower scheduling precedence, higher bit error rate, lower bandwidth, or longer transmission delay) and the like of the target service flow. The request message may further include sub-template information, QoS requirement information corresponding to the sub-template, and the like.

In exemplary embodiments, the service flow template information of the target service flow may include one or more of source IP address (source network address), source port number, destination IP address (destination network address), destination port number, Fully Qualified Domain Name (FQDN), Application Identity (APP ID) and the like of the target service flow.

In some embodiments, the request message may further include at least one of Data Network Name (DNN) information, Single Network Slice Selection Assistance Information (S-NSSAI) and the like of the target service flow.

In this embodiment of this disclosure, the sub-template information may include at least one of the size of the packet (which may be defined as a range) and specific packet mark information (i.e. the sub-QoS flow packet mark information mentioned above). For example, the packet mark information may be specific mark information on the IP header of the target packet. The QoS requirement information corresponding to the sub-template may be the scheduling precedence, bit error rate, transmission delay or bandwidth of the target packet corresponding to the sub-template.

In this embodiment of this disclosure, the AF network element may be a functional unit abstracted from a service server.

In S42, the NEF network element returns a response message to the AF network element.

In this embodiment of this disclosure, the AF network element may transmit a request message to the NEF network element, and the request message carries the above service requirement information. After receiving the request message transmitted by the AF network element, the NEF network element may authenticate and identify the request message, generate the corresponding response message, and return the response message to the AF network element.

The response message may include indication information on whether the request message is approved. If the authentication and identification of the request message are successful, the indication information indicates that the request message is approved; and if the authentication and identification of the request message are not successful, the indication information indicates that the request message is rejected. In some embodiments, the indication information may further include a rejection reason value.

In S43, the NEF network element transmits service requirement information directly or indirectly to the PCF network element.

In this embodiment of this disclosure, after the NEF network element has authenticated and identified the request message, the NEF network element may transmit the service requirement information carried in the request message to the PCF network element.

After receiving the service requirement information transmitted by the NEF network element, the PCF network element may generate corresponding PCC rules for the target service flow according to the service requirement information. The PCC rules for the target service flow may carry the service requirement information, the PCC rules for the target service flow may further include the PCC rules for the sub-QoS flow, and the PCC rules for the sub-QoS flow may include the aforementioned sub-template information and the QoS requirement information corresponding to the sub-template. Then, the PCC rules are transmitted to the SMF network element, and the SMF network element generates at least one of the sub-QoS rules for the sub-QoS flow, UPF data processing instructions, and a sub-QoS profile of the sub-QoS flow according to the received PCC rules for the sub-QoS flow.

In this embodiment of this disclosure, the SMF network element may generate a service flow template for the target service flow according to the service flow template information of the target service flow. The PCF network element may obtain the service flow template information of the target service flow from the request message transmitted by the AF network element, and may also obtain the service flow template information of the target service flow in other ways.

In this embodiment of this disclosure, the service flow template of the target service flow may include one or more of source IP address, source port number, destination IP address, destination port number, FQDN, APP ID, Internet Protocol (IP), and the like.

It is to be understood that the network elements (e.g., AF network element, PCF network element, AMF network element, SMF network element, NEF network element, and the like) in this embodiment of this disclosure, the sub-QoS flow, sub-QoS flow detection information of the sub-QoS flow, sub-QoS information, request message, PCC rules, sub-QoS flow packet mark information, scheduling precedence, sub-QoS rules, UPF data processing instructions, sub-QoS profile of the sub-QoS flow, and the like may be differently named.

According to the packet transmission method provided in this embodiment of this disclosure, the AF network element may transmit a request message to the NEF network element, and the request message may directly carry QoS requirement information of the target service flow, service flow template information of the target service flow, DNN and S-NSSAI of the target service flow, sub-template information, QoS requirement information corresponding to the sub-template, and the like, thereby reducing the number of interactions between the AF network element and the NEF network element.

Figure 5:
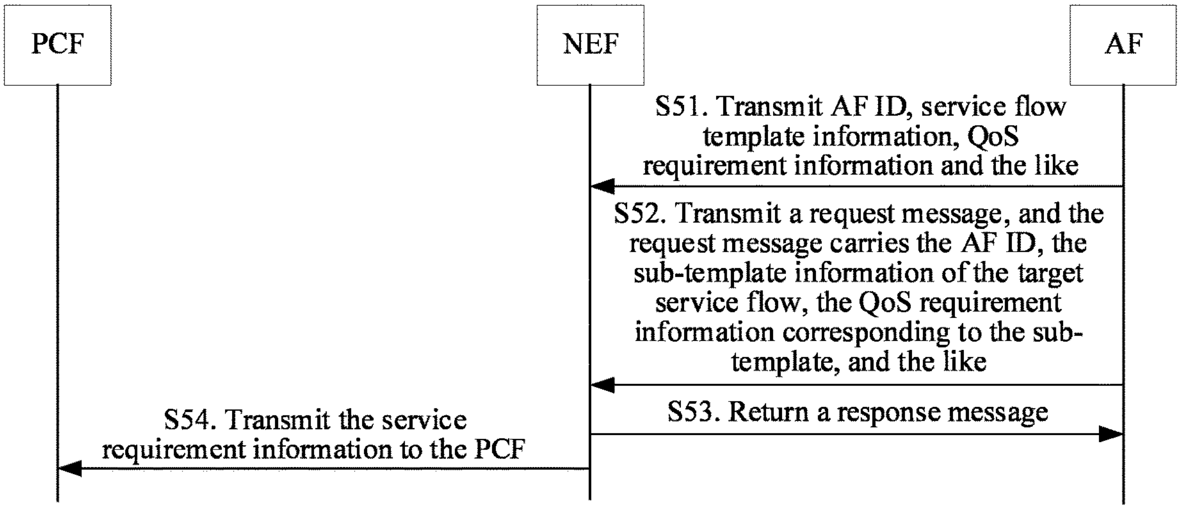
FIG. 5 is another interaction schematic diagram of a packet transmission method according to an embodiment of this disclosure.

FIG. 5 schematically illustrates an interaction diagram of a packet transmission method according to another embodiment of this disclosure.

As shown in FIG. 5, the method provided in this embodiment of this disclosure may include the following steps S51 to S54.

In S51, the AF network element transmits AF ID, service flow template information and QoS requirement information of the target service flow and the like to the NEF network element. In some embodiments, the AF network element may further transmit at least one of DNN information, S-NSSAI and the like of the target service flow to the NEF network element.

The NEF network element receives the AF ID and the service flow template information of the target service flow transmitted by the AF network element. The NEF network element may further receive at least one of the DNN information, S-NSSAI and the like of the target service flow, and associate the AF ID with the service flow template information of the target service flow for storage. In some embodiments, the NEF network element may further associate the AF ID with at least one of the DNN information, the S-NSSAI and the like of the target service flow for storage.

In S52, the AF network element transmits a request message to the NEF network element, and the request message carries the AF ID, the sub-template information of the target service flow, the QoS requirement information corresponding to the sub-template, and the like.

The NEF network element receives the request message transmitted by the AF network element, and authenticates and identifies the request message. After the authentication and identification of the request message are successful, the NEF network element may search for the associated storage according to the AF ID carried in the request message, and obtain at least one of the service flow template information, the DNN information, the S-NSSAI and the like of the target service flow.

In S53, the NEF network element returns a response message to the AF network element, and the response message includes indication information on whether the request message is approved.

In S54, the NEF network element transmits the service requirement information directly or indirectly to the PCF network element when the authentication and identification of the request message are successful.

According to the packet transmission method provided in this embodiment of this disclosure, the NEF network element may obtain the service flow template information, DNN information, S-NSSAI, QoS requirement information and the like of the target service flow from the AF network element in advance, and the NEF network element may associate the AF ID with the service flow template information, DNN information, S-NSSAI, QoS requirement information and the like of the target service flow for storage. In this way, when the AF network element transmits a request message to the NEF network element, the request message does not need to include the service flow template information, DNN information, S-NSSAI, QoS requirement information and the like of the target service flow, but only needs to carry the AF ID, the sub-template information of the target service flow, and the QoS requirement information corresponding to the sub-template, thereby reducing the quantity of data carried in the request message. according to the AF ID carried in the request message, the corresponding sub-template information of the target service flow, the QoS requirement information corresponding to the sub-template, and the like may be searched from the associated storage, and transmitted to the PCF network element.

Figure 6:
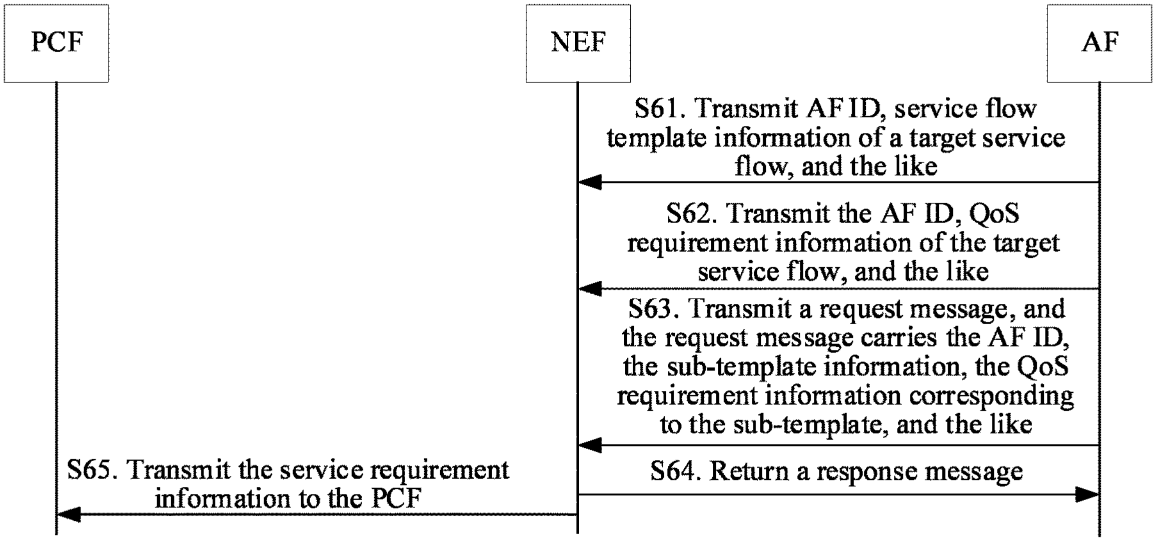
FIG. 6 is another interaction schematic diagram of a packet transmission method according to an embodiment of this disclosure.

FIG. 6 schematically illustrates an interaction diagram of a packet transmission method according to another embodiment of this disclosure.

As shown in FIG. 6, the method provided in this embodiment of this disclosure may include the following steps S61 to S65.

In S61, the AF network element transmits AF ID, service flow template information of the target service flow and the like to the NEF network element. In some embodiments, the AF network element may further transmit at least one of the DNN information, target S-NSSAI and the like of the target service flow to the NEF network element.

The NEF network element receives the AF ID and the service flow template information and the like of the target service flow transmitted by the AF network element, and associates the AF ID with the service flow template information and the like of the target service flow for storage.

In some embodiments, the NEF network element may further receive at least one of the DNN information, the target S-NSSAI and the like of the target service flow transmitted by the AF network element, and associate the AF ID with at least one of the DNN information, the target S-NSSAI and the like of the target service flow for storage.

In S62, the AF network element transmits the AF ID, the QoS requirement information of the target service flow and the like to the NEF network element.

The NEF network element receives the AF ID and the QoS requirement information and the like of the target service flow transmitted by the AF network element, and associates the AF ID with the QoS requirement information and the like of the target service flow for storage.

In S63, the AF network element transmits a request message to the NEF network element, and the request message carries the AF ID, the sub-template information, the QoS requirement information corresponding to the sub-template, and the like.

The NEF network element receives the request message transmitted by the AF network element, and authenticates and identifies the request message.

In S64, the NEF network element returns a response message to the AF network element, and the response message includes indication information on whether the request message is approved.

In S65, the NEF network element transmits the service requirement information directly or indirectly to the PCF network element when the authentication and identification of the request message are successful.

The NEF network element may retrieve the associated storage according to the AF ID carried in the request message, and obtain and transmit the service flow template information, DNN information, target S-NSSAI, QoS requirement information and the like of the target service flow as part of the service requirement information to the PCF network element.

According to the packet transmission method provided in this embodiment of this disclosure, the NEF network element may obtain the service flow template information, DNN information, S-NSSAI, QoS requirement information and the like of the target service flow from the AF network element in advance, the NEF network element may further obtain the QoS requirement information and the like of the target service flow from the AF network element, and the NEF network element may associate the AF ID with the service flow template information, DNN information, S-NSSAI, QoS requirement information and the like of the target service flow for storage respectively. In this way, when the AF network element transmits a request message to the NEF network element, the request message may not include the service flow template information, at least one of the DNN information and S-NSSAI, QoS requirement information and the like of the target service flow, but only needs to carry the AF ID, the sub-template information of the target service flow, and the QoS requirement information corresponding to the sub-template, thereby reducing the quantity of data carried in the request message. according to the AF ID carried in the request message, the corresponding sub-template information of the target business flow and the corresponding QoS requirement information of the sub-template may be found from the associated storage, and transmitted to the PCF network element.

Figure 7:
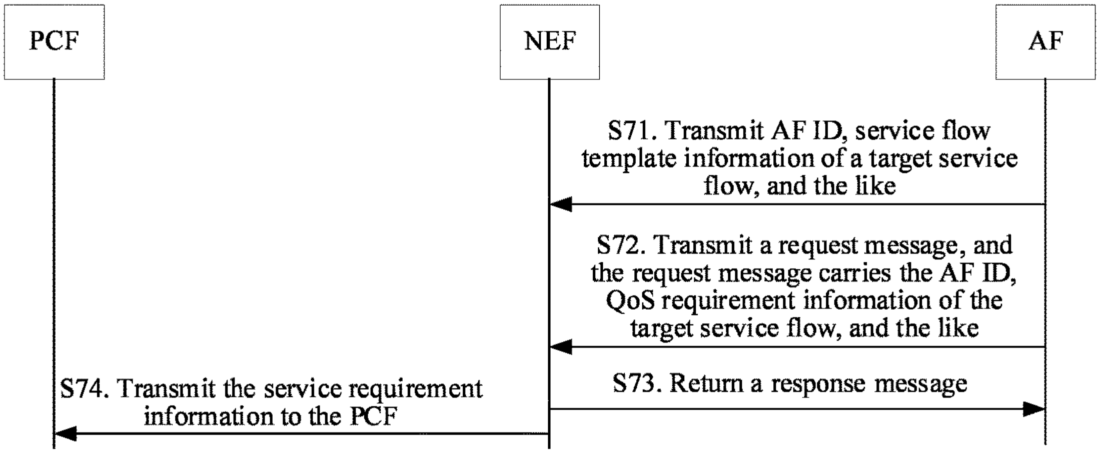
FIG. 7 is another interaction schematic diagram of a packet transmission method according to an embodiment of this disclosure.

FIG. 7 schematically illustrates an interaction diagram of a packet transmission method according to another embodiment of this disclosure.

As shown in FIG. 7, the method provided in this embodiment of this disclosure may include the following steps S71 to S74.

In S71, the AF network element transmits AF ID, service flow template information of the target service flow and the like to the NEF network element. In some embodiments, the AF network element may further transmit at least one of the DNN information, S-NSSAI and the like of the target service flow to the NEF network element.

The NEF network element receives the AF ID and the service flow template information and the like of the target service flow transmitted by the AF network element, and associates the AF ID with the service flow template information and the like of the target service flow for storage. In some embodiments, the NEF network element may further receive at least one of the DNN information, the S-NSSAI and the like of the target service flow transmitted by the AF network element, and associate the AF ID with at least one of the DNN information, the S-NSSAI and the like of the target service flow for storage.

In S72, the AF network element transmits a request message to the NEF network element, the request message carries the AF ID, the QoS requirement information of the target service flow and the like, and the request message may further include the sub-template information, the QoS requirement information corresponding to the sub-template, and the like.

The NEF network element receives the request message transmitted by the AF network element, and authenticates and identifies the request message.

In S73, the NEF network element returns a response message to the AF network element, and the response message includes indication information on whether the request message is approved.

In S74, the NEF network element transmits the service requirement information directly or indirectly to the PCF network element.

The NEF network element may search the associated storage according to the AF ID carried in the request message, and obtain and transmit at least one of the service flow template information, DNN information, S-NSSAI, and the like of the target service flow as part of the service requirement information to the PCF network element.

It can be understood that although the embodiments in FIGS. 4 to 7 take the AF network element and the PCF network element performing information interaction through the NEF network element as examples, this disclosure is not limited to this. In other embodiments, the AF network element may communicate directly with the PCF network element, that is, the PCF network element directly obtains service requirement information from the AF network element; and the NEF network element may store the service requirement information requested by AF in a UDR network element, and the PCF network element may receive the service requirement information from the UDR network element.

Figure 8:
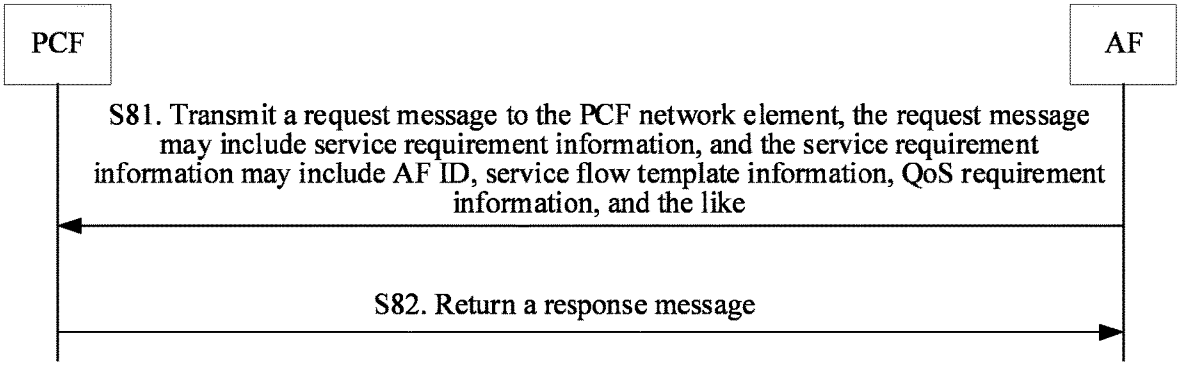
FIG. 8 is another interaction schematic diagram of a packet transmission method according to an embodiment of this disclosure.

As shown in FIG. 8, the method provided in this embodiment of this disclosure may include steps S81 and S82.

In S81, the AF network element transmits a request message to the PCF network element, the request message may include service requirement information, and the service requirement information may include AF ID, service flow template information, QoS requirement information, and the like, and may further include sub-template information, QoS requirement information corresponding to the sub-template, and the like.

In some embodiments, the service requirement information may further include at least one of the DNN information, S-NSSAI and the like of the target service flow.

In S82, the PCF network element returns a response message to the AF network element.

In this embodiment of this disclosure, the AF network element may transmit a request message to the PCF network element, and the request message carries the above service requirement information. After receiving the request message transmitted by the AF network element, the PCF network element may authenticate and identify the request message, generate the corresponding response message, and return the response message to the AF network element.

The response message may include indication information on whether the request message is approved. If the authentication and identification of the request message are successful, the indication information indicates that the request message is approved; and if the authentication and identification of the request message are not successful, the indication information indicates that the request message is rejected. In some embodiments, the indication information may further include a rejection reason value.

Figure 9:
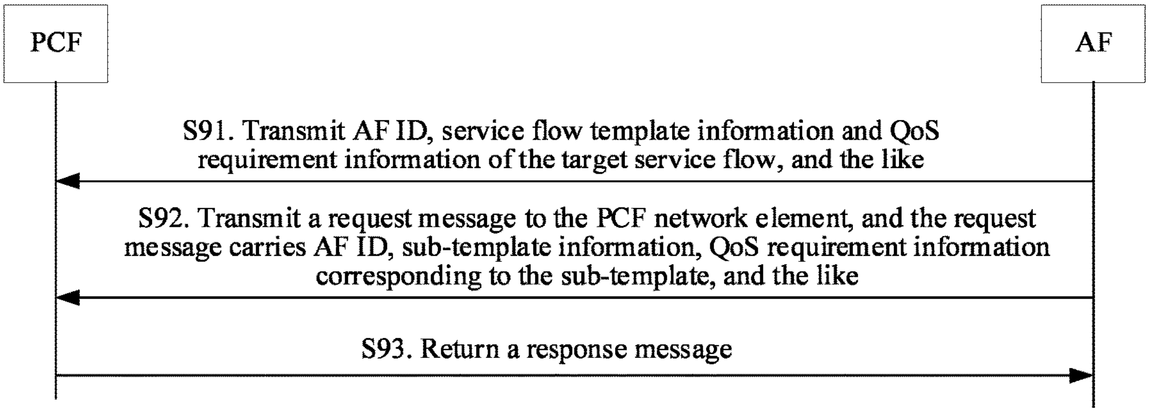
FIG. 9 is another interaction schematic diagram of a packet transmission method according to an embodiment of this disclosure.

FIG. 9 schematically illustrates an interaction diagram of a packet transmission method according to another embodiment of this disclosure.

As shown in FIG. 9, the method provided in this embodiment of this disclosure may include steps S91 to S93.

In S91, the AF network element transmits identifier information (AF ID), service flow template information and QoS requirement information of the target service flow and the like to the PCF network element. In some embodiments, the AF network element may further transmit at least one of DNN information, S-NSSAI and the like of the target service flow to the PCF network element.

The PCF network element receives the AF ID and the service flow template information of the target service flow transmitted by the AF network element. In some embodiments, the PCF network element may further receive at least one of the DNN information, the S-NSSAI and the like of the target service flow transmitted by the AF network element, and associate the AF ID with the service flow template information of the target service flow, and may further associate the AF ID with at least one of the DNN information, the S-NSSAI and the like of the target service flow for storage.

In S92, the AF network element transmits a request message to the PCF network element, and the request message carries the AF ID, the sub-template information, the QoS requirement information corresponding to the sub-template, and the like.

The PCF network element receives the request message transmitted by the AF network element, and authenticates and identifies the request message.

After the authentication and identification of the request message are successful, the PCF network element may search for the associated storage according to the AF ID carried in the request message, and obtain at least one of the service flow template information, the DNN information, the S-NSSAI and the like of the target service flow.

In S93, the PCF network element returns a response message to the AF network element, and the response message includes indication information on whether the request message is approved.

Figure 10:
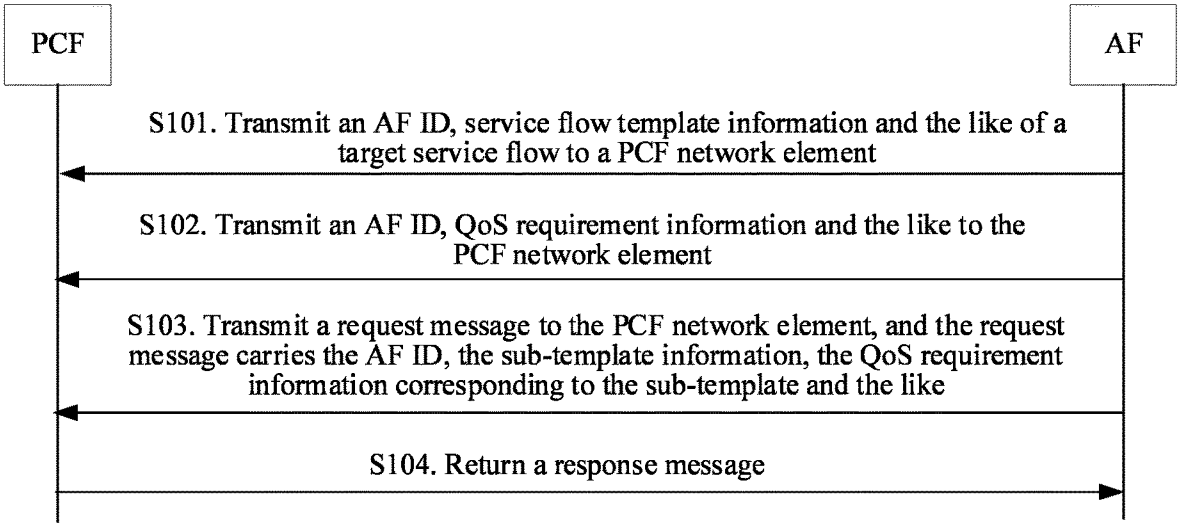
FIG. 10 is another interaction schematic diagram of a packet transmission method according to an embodiment of this disclosure.

FIG. 10 schematically illustrates an interaction diagram of a packet transmission method according to another embodiment of this disclosure.

As shown in FIG. 10, the method provided in this embodiment of this disclosure may include steps S101 to S104.

In S101, the AF network element transmits AF ID, service flow template information of the target service flow and the like to the PCF network element. In some embodiments, the AF network element may further transmit at least one of the DNN information, target S-NSSAI and the like of the target service flow to the PCF network element.

The PCF network element receives the AF ID and the service flow template information and the like of the target service flow transmitted by the AF network element, and associates the AF ID with the service flow template information and the like of the target service flow for storage.

In some embodiments, the PCF network element may further receive at least one of the DNN information, the target S-NSSAI and the like of the target service flow transmitted by the AF network element, and associate the AF ID with at least one of the DNN information, the target S-NSSAI and the like of the target service flow for storage.

In S102, the AF network element transmits the AF ID, QoS requirement information, and the like to the PCF network element.

The PCF network element receives the AF ID and the QoS requirement information and the like of the target service flow transmitted by the AF network element, and associates the AF ID with the QoS requirement information and the like of the target service flow for storage.

In S103, the AF network element transmits a request message to the PCF network element, and the request message carries the AF ID, the sub-template information, the QoS requirement information corresponding to the sub-template, and the like.

The PCF network element receives the request message transmitted by the AF network element, and authenticates and identifies the request message.

In S104, the PCF network element returns a response message to the AF network element, and the response message includes indication information on whether the request message is approved.

The PCF network element may retrieve the associated storage according to the AF ID carried in the request message, and obtain at least one of the service flow template information, DNN information, target S-NSSAI, QoS requirement information and the like of the target service flow as part of the service requirement information.

Figure 11:
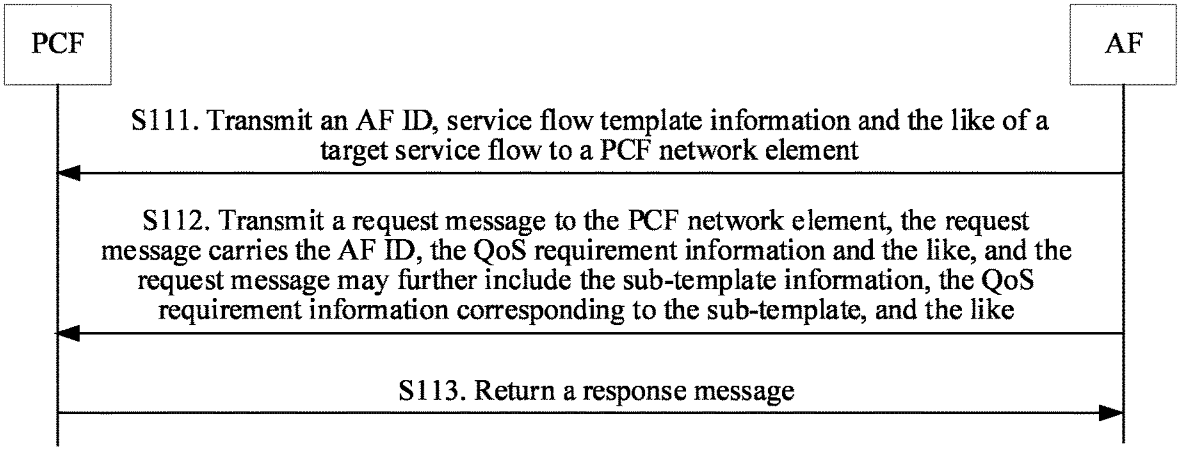
FIG. 11 is another interaction schematic diagram of a packet transmission method according to an embodiment of this disclosure.

FIG. 11 schematically illustrates an interaction diagram of a packet transmission method according to another embodiment of this disclosure.

As shown in FIG. 11, the method provided in this embodiment of this disclosure may include steps S111 to S113.

In S111, the AF network element transmits AF ID, service flow template information of the target service flow and the like to the PCF network element. In some embodiments, the AF network element may further transmit at least one of the DNN information, S-NSSAI and the like of the target service flow to the PCF network element.

The PCF network element receives the AF ID and the service flow template information and the like of the target service flow transmitted by the AF network element, and associates the AF ID with the service flow template information and the like of the target service flow for storage.

In some embodiments, the PCF network element may further receive at least one of the DNN information, the S-NSSAI and the like of the target service flow transmitted by the AF network element, and associate the AF ID with at least one of the DNN information, the S-NSSAI and the like of the target service flow for storage.

In S112, the AF network element transmits a request message to the PCF network element, the request message carries the AF ID, the QoS requirement information and the like, and the request message may further include the sub-template information, the QoS requirement information corresponding to the sub-template, and the like.

The PCF network element receives the request message transmitted by the AF network element, and authenticates and identifies the request message.

In S113, the PCF network element returns a response message to the AF network element, and the response message includes indication information on whether the request message is approved.

The PCF network element may search the associated storage according to the AF ID carried in the request message, and obtain and transmit at least one of the service flow template information, DNN information, S-NSSAI, and the like of the target service flow as part of the service requirement information to the PCF network element.

Figure 12:
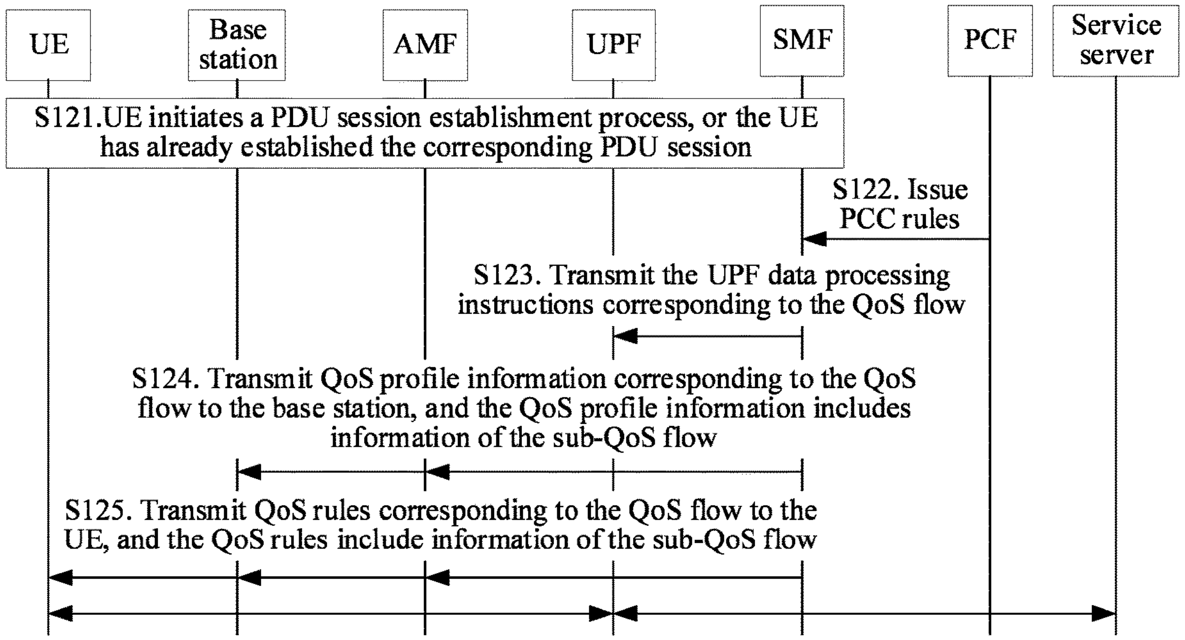
FIG. 12 is another interaction schematic diagram of a packet transmission method according to an embodiment of this disclosure.

FIG. 12 illustrates a schematic diagram of policy execution on a network side. In the embodiment of FIG. 12, UE is used as a target terminal and a base station is used as a network device for example. As shown in FIG. 12, the method provided in this embodiment of this disclosure may include steps S121 to S125:

In S121, UE initiates a Protocol Data Unit (PDU) session establishment process, or the UE has already established the corresponding PDU session.

In this embodiment of this disclosure, the UE has established a PDU session for the target service (e.g., a specific target DNN, and target S-NSSAI), or initiated a PDU session establishment process for the target service (e.g., for a specific target DNN, and target S-NSSAI).

In S122, the PCF network element issues PCC rules to the SMF network element.

The SMF network element receives the PCC rules issued by the PCF network element, and generates UPF data processing instructions corresponding to the QoS flow, Qos profile information corresponding to the QoS flow, and QoS rules corresponding to the QoS flow according to the service requirement information carried in the PCC rules. The QoS profile information corresponding to the QoS flow includes information of the sub-QoS flow, and the QoS rules corresponding to the QoS flow also include the information of the sub-QoS flow.

In S123, the SMF network element transmits the UPF data processing instructions corresponding to the QoS flow to the UPF network element. The UPF network element in this embodiment of this disclosure may include at least one of an anchor UPF network element and an intermediate UPF network element.

During the establishment or modification process of a PDU session, the SMF network element may generate UPF data processing instructions according to the PCC rules. The UPF data processing instructions may include Packet Detection Rules (PDR), PDR precedence, corresponding QoS information of the target service flow, and corresponding QoS Flow ID (QFI).

In this embodiment of this disclosure, the SMF network element may generate sub-QoS flow related information in the QoS flow, and the sub-QoS flow related information may include sub-QFI, sub-Packet Detection Rules (sub-PDR) corresponding to the sub-QoS flow, and sub-QoS information corresponding to the sub-QoS flow. The sub-PDR may include the sub-QoS flow detection information mentioned. The sub-QoS information corresponding to the sub-QoS flow may include the scheduling precedence, bit error rate, transmission delay or the like of the sub-QoS flow.

In an exemplary embodiment, the UPF data processing instructions may further include sub-PDR corresponding to the sub-QoS flow, sub-QoS information of the sub-QoS flow, and the corresponding sub-QFI. In some embodiments, the UPF data processing instructions may further include the precedence of each sub-PDR.

The UPF network element receives the UPF data processing instructions corresponding to the QoS flow transmitted by the SMF network element. In this way, when receiving a packet to be forwarded, the UPF network element may process the received packet to be forwarded according to the UPF data processing instructions corresponding to the QoS flow.

For example, when receiving an uplink packet to be forwarded transmitted by the UE through a base station, the UPF network element first determines whether the uplink packet to be transmitted matches the sub-QFI of the QoS flow. If it does, the sub-QoS information corresponding to the sub-QoS flow may be obtained, and the uplink packet to be transmitted may be processed according to the sub-QoS information. For example, the uplink packet to be transmitted is prioritized for transmission according to the scheduling precedence included in the sub-QoS information, or when network congestion is detected, the uplink packet to be transmitted is not dropped according to the bit error rate included in the sub-QoS information, but other packets are dropped. For another example, when receiving a downlink packet to be forwarded transmitted by the service server, the UPF network element first confirms which QoS flow the packet belongs to, and then determines whether the downlink packet to be forwarded belongs to the specific sub-QoS flow according to the sub-QoS flow detection information in the sub-PDR in the sub-QoS information included in the QoS flow related information. For example, if the sub-QoS flow detection information includes the size of the packet of the sub-QoS flow, whether the size of the downlink packet to be forwarded falls within the range of the size of the packet of the sub-QoS flow is determined. If it does, it is determined that the downlink packet to be forwarded belongs to the specific sub-QoS flow, then, the downlink packet to be forwarded is encapsulated with the QFI of the target service flow and the sub-QFI corresponding to the specific sub-QoS flow, and the downlink packet to be forwarded encapsulated with the QFI of the target business flow and the sub-QFI is further transmitted to the UE through the base station. If it does not, the downlink packet to be forwarded is encapsulated with the QFI of the target service flow, and then the downlink packet to be forwarded encapsulated with the QFI of the target service flow is further transmitted to the UE through the base station. For another example, if the sub-QoS flow detection information includes the sub-QoS flow packet mark information, whether the downlink packet to be forwarded matches the sub-QoS flow packet mark information of the sub-QoS flow is determined. If it does, it is determined that the downlink packet to be forwarded belongs to the specific sub-QoS flow, then, the downlink packet to be forwarded is encapsulated with the QFI of the target service flow and the sub-QFI corresponding to the specific sub-QoS flow, and the downlink packet to be forwarded encapsulated with the QFI of the target business flow and the sub-QFI is further transmitted to the UE through the base station. If it does not, the downlink packet to be forwarded is encapsulated with the QFI of the target service flow, and then the downlink packet to be forwarded encapsulated with the QFI of the target service flow is further transmitted to the UE through the base station.

In this embodiment of this disclosure, if the QoS flow includes multiple sub-QoS flows, each sub-QoS flow may include the corresponding sub-QFI, sub-PDR, and sub-QoS information.

In some embodiments, when there are multiple sub-PDRs, corresponding precedence may be configured for each sub-PDR, and the precedence of the sub-PDR indicates the order for matching the sub-PDRs when there are multiple sub-PDRs. For example, the higher the precedence, the earlier a sub-PDR is matched, and the sub-PDR matched first is used as the adopted sub-PDR.

For example, assuming that the sub-QoS flow includes a sub-QoS flow 1 and a sub-QoS flow 2 which correspond to a sub-QFI 1 and a sub-QFI 2 and have sub-PDR 1 and sub-PDR 2 respectively with the corresponding priorities, and assuming that the precedence of the sub-PDR 1 is higher than that of the sub-PDR 2, if the size of the packet in the sub-PDR 1 is set to less than 1000 bits and the size of the packet in the sub-PDR 2 is set to less than 1200 bits, the UPF network element matches the downlink packet to be forwarded with the sub-PDR 1 when receiving the downlink packet to be forwarded. If the size of the downlink packet to be forwarded is 900 bits, the downlink packet to be forwarded is encapsulated with the sub-QFI 1. It is to be understood that the sub-PDR in this embodiments of this disclosure may be included in the PDR or set separately from the PDR.

In S124, the SMF network element transmits QoS profile information corresponding to the QoS flow to the base station through the AMF network element, and the QoS profile information may include information of the sub-QoS flow.

In this embodiment of this disclosure, the SMF network element transmits QoS profile information or updated QoS profile information to the AMF network element, and the QoS profile information includes information of the sub-QoS flow. The AMF network element receives the QoS profile information transmitted by the SMF network element and transmits the QoS profile information to the base station. The base station receives the QoS profile information transmitted by the AMF network element.

During the establishment or modification process of a PDU session, the SMF network element may generate the QoS profile according to the PCC rules and transmit the QoS profile and the corresponding QFI to the base station.

In this embodiment of this disclosure, the SMF network element may generate sub-QoS flow related information in the QoS flow and transmit the sub-QoS flow related information to the base station, and the sub-QoS flow related information may include the sub-QFI and the sub-QoS profile corresponding to the sub-QoS flow. The sub-QoS profile may include the sub-QoS information of the sub-QoS flow, for example, the sub-QoS profile may include at least one of the scheduling precedence, bit error rate, transmission delay, and the like.

In this embodiment of this disclosure, the base station may process the received packet to be forwarded according to the received sub-QFI and sub-QoS profile.

For example, the UE may encapsulate a specific target uplink packet (included in the target packets) with the QFI and the sub-QFI, and then transmit the target uplink packet encapsulated with the QFI and the sub-QFI to the base station. The base station receives the target uplink packet encapsulated with the QFI and the sub-QFI as the uplink packet to be forwarded, and matches the uplink packet to be forwarded with the stored sub-QFI. If the uplink packet to be forwarded matches a certain sub-QFI stored, the sub-QoS profile corresponding to the matched sub-QFI is obtained, and then how to process the uplink packet to be forwarded is determined according to the sub-QoS information in the sub-QoS profile. For example, if the sub-QoS information includes the scheduling precedence, the uplink packet to be forwarded is prioritized for transmission according to the scheduling precedence; and if the sub-QoS information includes the bit error rate, the corresponding scheduling algorithm is configured when network congestion occurs. If the uplink packet to be forwarded does not match any sub-QFI stored, the uplink packet to be forwarded is processed as a regular packet in the QoS flow, and needs to comply with the requirements of the QoS flow profile. For another example, the UPF may encapsulate a specific downlink packet to be forwarded with the QFI and the sub-QFI, and then transmit the downlink packet to be forwarded encapsulated with the QFI and the sub-QFI to the base station. The base station receives the downlink packet to be forwarded encapsulated with the QFI and the sub-QFI, and matches the downlink packet to be forwarded with the stored sub-QFI. If the downlink packet to be forwarded matches a certain sub-QFI stored, the sub-QoS profile corresponding to the matched sub-QFI is obtained, and then how to process the downlink packet to be forwarded is determined according to the sub-QoS information in the sub-QoS profile. For example, if the sub-QoS information includes the scheduling precedence, the downlink packet to be forwarded is prioritized for transmission according to the scheduling precedence; and if the sub-QoS information includes the bit error rate, the corresponding scheduling algorithm is configured when network congestion occurs. If the downlink packet to be forwarded does not match any sub-QFI stored, the downlink packet to be forwarded is processed as a regular packet in the QoS flow, and needs to comply with the requirements of the QoS flow profile.

In S125, the SMF network element sequentially transmits QoS rules corresponding to the QoS flow to the UE through the AMF network element and the base station, and the QoS rules include information of the sub-QoS flow.

During the establishment or modification process of a PDU session, the SMF network element may generate QoS rules according to the PCC rules issued by the PCF network element, and transmit the QoS rules to the UE. The QoS rules may include the QFI corresponding to the QoS flow, a Packet Filter Set, and a QoS rule precedence value. The QoS rule precedence value is used for indicating the matching order of the QoS rules. The packet filter set may include an IP Packet Filter Set and an Ethernet Packet Filter Set.

In this embodiment of this disclosure, the IP Packet Filter Set may include at least one of the following for the session type of the IP PDU:

Source/destination IP address or IPv6 prefix.

Source/destination port number.

Protocol ID of the protocol above IP/Next header type.

Type of Service (TOS) (IPv4)/Traffic class (IPv6) and Mask.

Flow Label (IPv6).

Security parameter index.

Packet Filter direction.

In this embodiment of this disclosure, the Ethernet Packet Filter Set may include at least one of the following for the session type of the Ethernet PDU:

Source/destination Media Access Control (MAC) address.

Ethertype as defined in IEEE 802.3.

Customer—Virtual Local Area Network (VLAN) tag (C-TAG) and/or Service-VLAN tag (S-TAG) VLAN Identifier (VID) fields as defined in IEEE Std 802.1Q.

Customer—VLAN tag (C-TAG) and/or Service-VLAN tag (S-TAG) Priority Code Point (PCP)/Drop Eligible Indicator (DEI) fields as defined in IEEE Std 802.1Q.

IP Packet Filter Set, in the case that Ethertype indicates IPv4/IPv6 payload.

Packet Filter direction.

In this embodiment of this disclosure, the SMF network element may add sub-QoS flows to the QoS flow, and each sub-QoS flow correspondingly includes a sub-QFI and a packet filter sub-set. A sub-QFI and a packet filter sub-set for each sub-QoS flow are added to the QoS rules generated by the SMF network element. The packet filter sub-set may include sub-QoS flow detection information of the sub-QoS flow. After receiving the QoS rules, the UE may determine whether the size of the specific target uplink packet is within a range of the size of the packet according to the requirements of the QoS rules if the sub-QoS flow detection information includes the size of the packet of the sub-QoS flow. If the size of the specific target uplink packet is within the range of the size of the packet, the target uplink packet is encapsulated with the QFI of the QoS flow and the sub-QFI of the sub-QoS flow and transmitted to the base station. If the size of the specific target uplink packet is not within the range of the size of the packet, the target uplink packet is encapsulated with the QFI of the QoS flow and transmitted to the base station.

For another example, if the sub-QoS flow detection information includes the sub-QoS flow packet mark information of the sub-QoS flow, then whether the packet header mark information of the specific target uplink packet matches the sub-QoS flow packet mark information is first determined. If the packet header mark information of the specific target uplink packet matches the sub-QoS flow packet mark information, the target uplink packet is encapsulated with the QFI of the QoS flow and the sub-QFI of the sub-QoS flow and transmitted to the base station. If the type of the specific target uplink packet does not match the sub-QoS flow packet mark information, the target uplink packet is encapsulated with the QFI of the QoS flow and transmitted to the base station.

In this embodiment of this disclosure, if the QoS flow is of the IP type, the packet filter sub-set is an IP packet filter sub-set including at least one of the following:

size of the packet; and specific packet mark information, e.g., specific mark information on the packet IP header.

In this embodiment of this disclosure, if the QoS flow is of the Ethernet type, the packet filter sub-set is an Ethernet packet filter sub-set including at least one of the following:

size of the packet; and specific packet mark information, e.g., specific mark information on the packet header.

If the packet in the QoS flow matches the packet filter sub-set corresponding to the sub-QoS flow, the sub-QFI is added on the basis of the QFI. If the packet in the QoS flow does not match any packet filter sub-set corresponding to the sub-QoS flow, the packet is considered to belong to the QoS flow, but not to any sub-QoS flow.

In this embodiment of this disclosure, each QoS flow may have one or more sub-QoS flows. By defining QoS sub-flows within the QoS flow, different types of packets may be subdivided within the QoS flow, e.g., a sub-QoS flow corresponds to higher scheduling precedence or lower bit error rate.

In some embodiments, each sub-QoS rule may further correspond to the respective sub-QoS rule precedence value to indicate the matching order of the sub-QoS rules.

For example, assuming that multiple sub-QoS rules are included, e.g., a sub-QoS rule 1 and a sub-QoS rule 2, if the sub-QoS rule precedence value of the sub-QoS rule 1 is higher than that of the sub-QoS rule 2, the UE first matches the target uplink packet with the sub-QoS rule 1. If the target uplink packet matches the sub-QoS rule 1, the target uplink packet is encapsulated with the sub-QFI 1 corresponding to the sub-QoS rule 1. If the target uplink packet does not match the sub-QoS rule 1, the target uplink packet is matched with the sub-QoS rule 2. If the target uplink packet matches the sub-QoS rule 2, the target uplink packet is encapsulated with the sub-QFI 2 corresponding to the sub-QoS rule 2.

In the embodiment of FIG. 12, the execution order of S123, S124, and S125 is not limited and may also be parallel.

In the embodiment of FIG. 12, the SMF network element transmits the UPF data processing instructions corresponding to the QoS flow to the UPF network element, the QoS profile information to the base station, and the QoS rules to the UE, which is not limited in this disclosure.

In some embodiments, the SMF network element transmits the QoS rules to the UE and the QoS profile to the base station; the UE packs the target uplink packet with the sub-QFI and then transmits the target uplink packet to the base station; and the base station detects and processes the target uplink packet encapsulated with the sub-QFI using the QoS profile. In other embodiments, the SMF network element transmits the QoS rules to the UE and the UPF data processing instructions to the UPF network element; the UE packs the target uplink packet with the sub-QFI and transmits the target uplink packet to the UPF network element through the base station; and the UPF network element detects and processes the target uplink packet encapsulated with the sub-QFI using the UPF data processing instructions. In some more embodiments, the SMF network element transmits the QoS profile to the base station and the UPF data processing instructions to the UPF network element; the UPF network element packs a downlink packet to be forwarded received from a service server with the sub-QFI and transmits the downlink packet to be forwarded encapsulated with the sub-QFI to the base station; and the base station detects and processes the downlink packet to be forwarded encapsulated with the sub-QFI using the QoS profile.

For a specific target service, e.g., AR and VR, the packets in the data flows thereof may have different importance or characteristics. For example, a specific target packet may correspond to key image data information in the target service, or a specific target packet may correspond to control information in the target service. When these packets are transmitted in the same target service flow, it is necessary to give priority to ensuring that these key target packets have a lower packet error rate, higher transmission precedence, or the like. The packet transmission method provided in this embodiment of this disclosure, by introducing the sub-QoS flows, achieves the subdivision capability within the QoS flow in a mobile network, meets diverse data transmission requirements of services, and ensures the transmission quality of key target packets in the same data flow.

Figure 13:
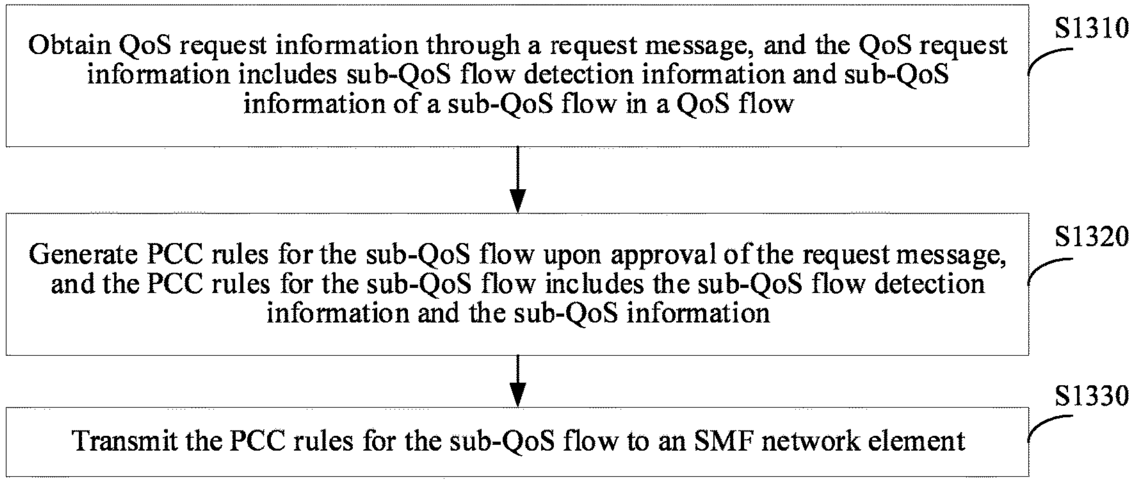
FIG. 13 is a flowchart of a packet transmission method according to an embodiment of this disclosure.

FIG. 13 schematically illustrates a flowchart of a packet transmission method according to another embodiment of this disclosure. The method provided in the embodiment of FIG. 13 may be performed by a PCF network element.

As shown in FIG. 13, the method provided in this embodiment of this disclosure may include steps S1310 to S1330.

In S1310, QoS request information is obtained through a request message, and the QoS request information may include sub-QoS flow detection information and sub-Qos information of a sub-QoS flow in a QoS flow.

In S1320, PCC rules for the sub-QoS flow are generated upon approval of the request message, and the PCC rules for the sub-QoS flow may include the sub-QoS flow detection information and the sub-QoS information.

In S1330, the PCC rules for the sub-QoS flow are transmitted to an SMF network element.

A reference may be made to other embodiments mentioned above for other contents of the embodiment of FIG. 13.

Figure 14:
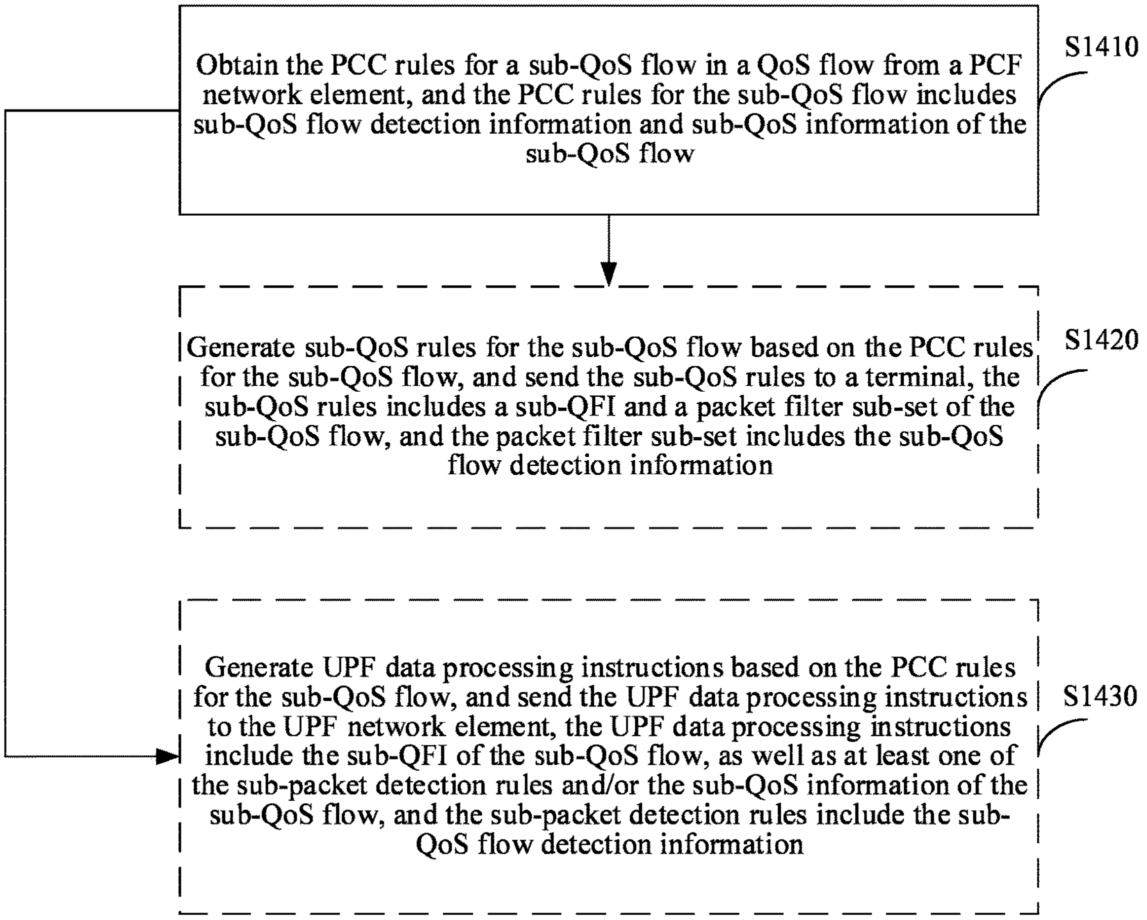
FIG. 14 is another flowchart of a packet transmission method according to an embodiment of this disclosure.

FIG. 14 schematically illustrates a flowchart of a packet transmission method according to another embodiment of this disclosure. The method provided in the embodiment of FIG. 14 may be performed by an SMF network element.

As shown in FIG. 14, the method provided in this embodiment of this disclosure may include S1410, and may further include at least one of S1420 and S1430.

In S1410, PCC rules for a sub-QoS flow in a QoS flow are obtained from a PCF network element, and the PCC rules for the sub-QoS flow may include sub-QoS flow detection information and sub-QoS information of the sub-QoS flow.

In S1420, sub-QoS rules for the sub-QoS flow are generated according to the PCC rules for the sub-QoS flow, and the sub-QoS rules are transmitted to a terminal. The sub-QoS rules may include a sub-QFI and a packet filter sub-set of the sub-QoS flow, and the packet filter sub-set may include the sub-QoS flow detection information.

In S1430, UPF data processing instructions are generated according to the PCC rules for the sub-QoS flow, and transmitted to the UPF network element. The UPF data processing instructions may include the sub-QFI of the sub-QoS flow, as well as at least one of the sub-packet detection rules and the sub-QoS information of the sub-QoS flow. The sub-packet detection rules may include the sub-QoS flow detection information.

In an exemplary embodiment, the method provided in the embodiment of FIG. 14 may further include: generating a sub-QoS profile of the sub-QoS flow according to the PCC rules for the sub-QoS flow; and transmitting the sub-QFI and the sub-QoS profile of the sub-QoS flow to a network device. The sub-QoS profile may include the sub-QoS information. A reference may be made to other embodiments mentioned above for other contents of the embodiment of FIG. 14.

Figure 15:
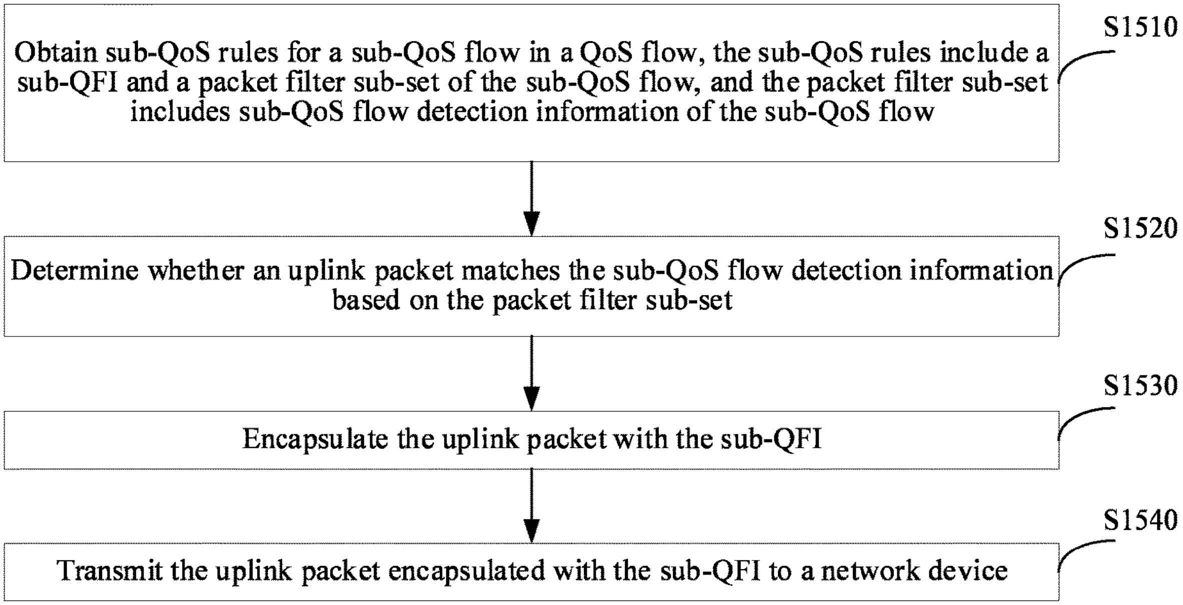
FIG. 15 is a flowchart of another packet transmission method according to an embodiment of this disclosure.

FIG. 15 schematically illustrates a flowchart of a packet transmission method according to another embodiment of this disclosure. The method provided in the embodiment of FIG. 15 may be performed by a terminal, which is not limited in this disclosure.

As shown in FIG. 15, the method provided in this embodiment of this disclosure may include steps S1510 to S1540.

In S1510, sub-QoS rules for a sub-QoS flow in a QoS flow are obtained, the sub-QoS rules include a sub-QFI and a packet filter sub-set of the sub-QoS flow, and the packet filter sub-set includes the sub-QoS flow detection information of the sub-QoS flow.

In S1520, whether an uplink packet to be transmitted matches the sub-QoS flow detection information is determined according to the packet filter sub-set.

In S1530, the uplink packet to be transmitted is encapsulated with the sub-QFI.

In S1540, the uplink packet to be transmitted encapsulated with the sub-QFI is transmitted to the network device.

In some embodiments, the sub-QoS flow detection information may include the size of the packet of the sub-QoS flow. The determining whether the uplink packet to be transmitted matches the sub-QoS flow detection information according to the packet filter sub-set may include: if the size of the uplink packet to be transmitted matches the size of the packet of the sub-QoS flow, determining that the uplink packet to be transmitted matches the sub-QoS flow detection information.

In some embodiments, the sub-QoS flow detection information may include sub-QoS flow packet mark information of the sub-QoS flow. The determining whether the uplink packet to be transmitted matches the sub-QoS flow detection information according to the packet filter sub-set may include: if the uplink packet to be transmitted matches the sub-QoS flow packet mark information, determining that the uplink packet to be transmitted matches the sub-QoS flow detection information.

In some embodiments, if the QoS flow is of the IP type, the packet filter sub-set may include an IP packet filter sub-set, and the IP packet filter sub-set may include sub-QoS flow packet mark information on the IP header of the packet. If the QoS flow is of the Ethernet type, the packet filter sub-set may include an Ethernet packet filter sub-set, and the Ethernet packet filter sub-set may include sub-QoS flow packet mark information on the header of the packet.

In some embodiments, if the QoS flow includes multiple sub-QoS flows, the QoS flow includes multiple sub-QoS rules corresponding to the multiple sub-QoS flows, and each sub-QoS rule may further include a corresponding sub-QoS rule precedence value. The determining whether the uplink packet to be transmitted matches the sub-QoS flow detection information according to the packet filter sub-set may include: matching the uplink packet to be transmitted with the sub-QoS flow detection information in each sub-QoS rule in the order according to the sub-QoS rule precedence value. The encapsulating the uplink packet to be transmitted with the sub-QFI may include: encapsulating the uplink packet to be transmitted with the sub-QFI corresponding to the first matched sub-QoS flow detection information.

A reference may be made to other embodiments mentioned above for other contents of the embodiment of FIG. 15.

Figure 16:
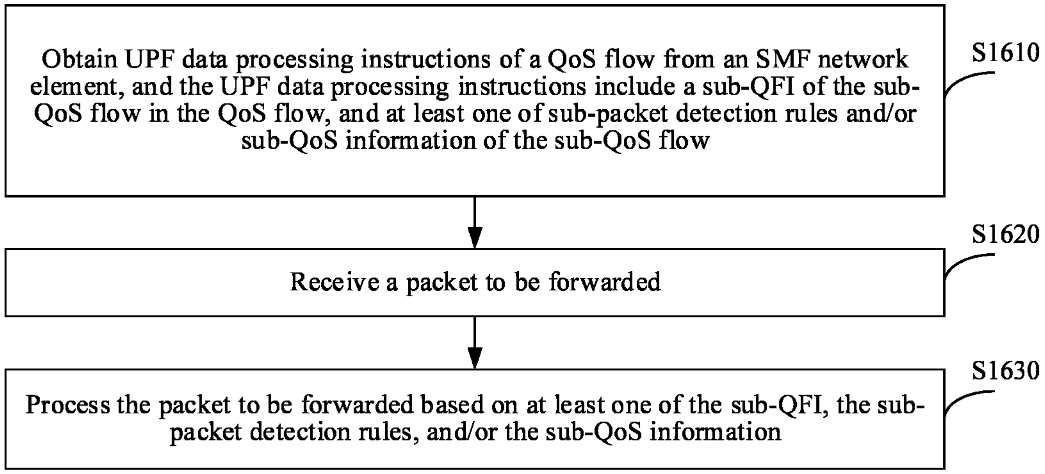
FIG. 16 is a flowchart of another packet transmission method according to an embodiment of this disclosure.

FIG. 16 schematically illustrates a flowchart of a packet transmission method according to another embodiment of this disclosure. The method provided in the embodiment of FIG. 16 may be performed by a UPF network element.

As shown in FIG. 16, the method provided in this embodiment of this disclosure may include steps S1610 to S1630.

In S1610, UPF data processing instructions of a QoS flow are obtained from an SMF network element, and the UPF data processing instructions may include a sub-QFI of a sub-QoS flow in the QoS flow, and at least one of sub-packet detection rules and sub-QoS information of the sub-QoS flow.

In S1620, a packet to be forwarded is received.

In S1630, the packet to be forwarded is processed according to at least one of the sub-QFI, the sub-packet detection rules, and the sub-QoS information.

In an exemplary embodiment, when the UPF network element is an anchor UPF network element, and the UPF data processing instructions include the sub-packet detection rules, the sub-packet detection rules may include the sub-QoS flow detection information, and the packet to be forwarded may include a downlink packet to be forwarded. The processing the packet to be forwarded according to the sub-QFI and the sub-packet detection rules may include: if it is determined that the downlink packet to be forwarded matches the sub-QoS flow detection information in the sub-packet detection rules, encapsulating the downlink packet to be forwarded with the sub-QFI; and transmitting the downlink packet to be forwarded encapsulated with the sub-QFI to a network device or an intermediate UPF network element.

In an exemplary embodiment, when the UPF data processing instructions include the sub-QoS information, the packet to be forwarded may include an uplink packet to be forwarded. The processing the packet to be forwarded according to the sub-QFI and the sub-QoS information may include: if the uplink packet to be forwarded matches the sub-QFI, processing the uplink packet to be forwarded according to the sub-QoS information.

A reference may be made to other embodiments mentioned above for other contents of the embodiment of FIG. 16.

Figure 17:
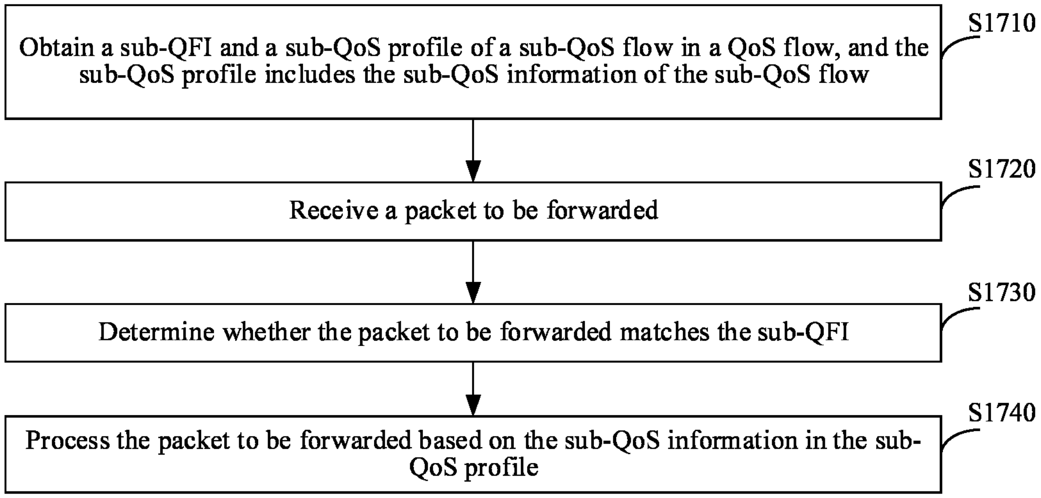
FIG. 17 is a flowchart of another packet transmission method according to an embodiment of this disclosure.

FIG. 17 schematically illustrates a flowchart of a packet transmission method according to another embodiment of this disclosure. The method provided in the embodiment of FIG. 17 may be performed by a network device, which is not limited in this disclosure.

As shown in FIG. 17, the method provided in this embodiment of this disclosure may include steps S1710 to S1740.

In S1710, a sub-QFI and a sub-QoS profile of a sub-QoS flow in a QoS flow are obtained, and the sub-QoS profile may include sub-QoS information of the sub-QoS flow.

In S1720, a packet to be forwarded is received.

In S1730, whether the packet to be forwarded matches the sub-QFI is determined.

In S1740, the packet to be forwarded is processed according to the sub-QoS information in the sub-QoS profile.

A reference may be made to other embodiments mentioned above for other contents of the embodiment of FIG. 17.

Figure 18:
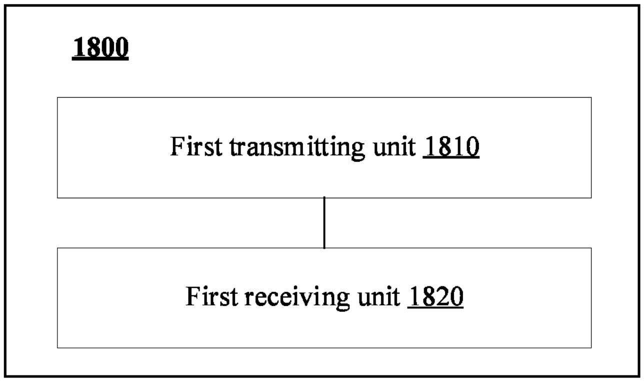
FIG. 18 is a block diagram of an Application Function (AF) network element according to an embodiment of this disclosure.

An AF network element 1800 provided in the embodiment of FIG. 18 may include a first transmitting unit 1810 and a first receiving unit 1820. The first transmitting unit 1810 is configured to transmit QoS request information to a PCF network element through a request message, and the QoS request information may include sub-QoS flow detection information and sub-QoS information of a sub-QoS flow in a QoS flow. The first receiving unit 1820 is configured to receive a response message for the request message, and the response message may include indication information on whether the request message is approved. The QoS request information may be used for indicating the PCF network element to generate PCC rules for the sub-QoS flow upon approval of the request message. The PCC rules for the sub-QoS flow may include the sub-QoS flow detection information and the sub-QoS information.

In some embodiments, the sub-QoS flow detection information may include at least one of the size of the packet of the sub-QoS flow and sub-QoS flow packet mark information.

In some embodiments, the sub-QoS information may include at least one of the scheduling precedence, bit error rate, transmission delay and the like of a target packet of the sub-QoS flow.

Figure 19:
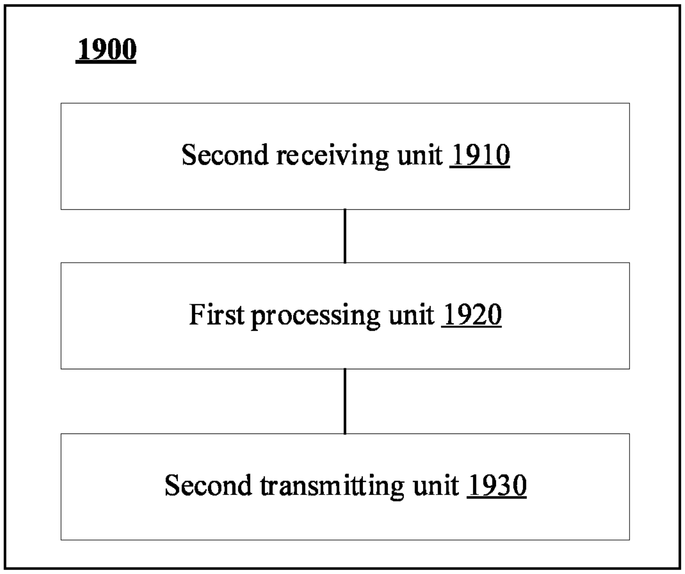
FIG. 19 is a schematic structural diagram of a Policy Control Function (PCF) network element according to an embodiment of this disclosure.

A PCF network element 1900 provided in the embodiment of FIG. 19 may include a second receiving unit 1910, a first processing unit 1920, and a second transmitting unit 1930. The second receiving unit 1910 is configured to obtain QoS request information through a request message, and the QoS request information may include sub-QoS flow detection information and sub-QoS information of a sub-QoS flow in a QoS flow. The first processing unit 1920 is configured to generate PCC rules for the sub-QoS flow upon approval of the request message, and the PCC rules for the sub-QoS flow may include the sub-QoS flow detection information and the sub-QoS information. The second transmitting unit 1930 is configured to transmit the PCC rules for the sub-QoS flow to the SMF network element.

Figure 20:
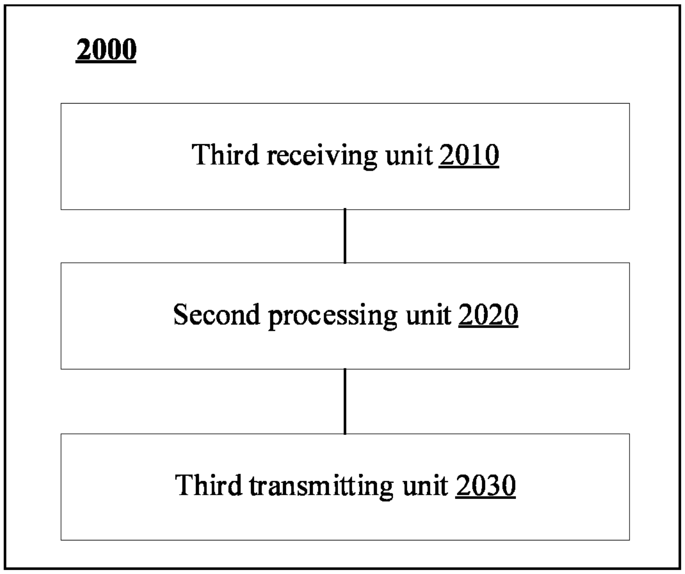
FIG. 20 is a schematic structural diagram of a Session Management Function (SMF) network element according to an embodiment of this disclosure.

An SMF network element 2000 provided in the embodiment of FIG. 20 may include a third receiving unit 2010, a second processing unit 2020, and a third transmitting unit 2030. The third receiving unit 2010 is configured to obtain PCC rules for a sub-QoS flow from the PCF network element, and the PCC rules of the sub-QoS flow may include sub-QoS flow detection information and sub-QoS information of the sub-QoS flow. The second processing unit 2020 is configured to perform at least one of the following steps: generate sub-QoS rules for the sub-QoS flow according to the PCC rules for the sub-QoS flow; and generate UPF data processing instructions according to the PCC rules for the sub-QoS flow. The third transmitting unit 2030 is configured to perform at least one of the following steps: transmit the sub-QoS rules to a terminal, the sub-QoS rules may include a sub-QFI and a packet filter sub-set of the sub-QoS flow, and the packet filter sub-set may include the sub-QoS flow detection information; and transmit the UPF data processing instructions to the UPF network element, the UPF data processing instructions may include the sub-QFI of the sub-QoS flow, as well as at least one of the sub-packet detection rules and the sub-QoS information of the sub-QoS flow, and the sub-packet detection rules may include the sub-QoS flow detection information.

In some embodiments, the second processing unit 2020 is further configured to generate a sub-QoS profile of the sub-QoS flow according to the PCC rules for the sub-QoS flow. The third transmitting unit 2030 is further configured to transmit the sub-QFI and the sub-QoS profile of the sub-QoS flow to a network device. The sub-QoS profile may include the sub-QoS information.

Figure 21:
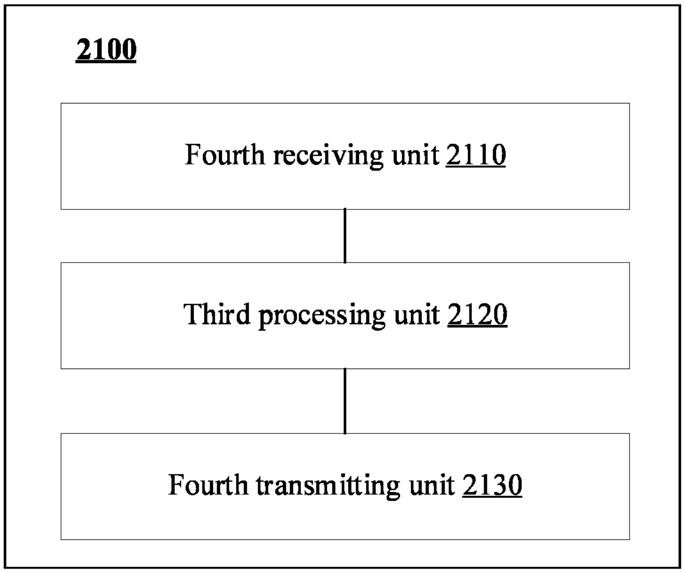
FIG. 21 is a schematic structural diagram of a terminal according to an embodiment of this disclosure.

A terminal 2100 provided in the embodiment of FIG. 21 may include a fourth receiving unit 2110, a third processing unit 2120, and a fourth transmitting unit 2130. The fourth receiving unit 2110 is configured to obtain sub-QoS rules for a sub-QoS flow in a QoS flow, the sub-QoS rules may include a sub-QFI and a packet filter sub-set of the sub-QoS flow, and the packet filter sub-set may include sub-QoS flow detection information of the sub-QoS flow. The third processing unit 2120 is configured to determine whether an uplink packet to be transmitted matches the sub-QoS flow detection information according to the packet filter sub-set. The third processing unit 2120 is further configured to encapsulate the uplink packet to be transmitted with the sub-QFI. The fourth transmitting unit 2130 is configured to transmit the uplink packet to be transmitted encapsulated with the sub-QFI to a network device.

In some embodiments, the sub-QoS flow detection information may include the size of the packet of the sub-QoS flow. The third processing unit 2120 is further configured to determine whether the uplink packet to be transmitted matches the sub-QoS flow detection information if the size of the uplink packet to be transmitted matches the size of the packet of the sub-QoS flow.

In some embodiments, the sub-QoS flow detection information may include sub-QoS flow packet mark information of the sub-QoS flow. The third processing unit 2120 is further configured to determine whether the uplink packet to be transmitted matches the sub-QoS flow detection information if the uplink packet to be transmitted matches the sub-QoS flow packet mark information.

In some embodiments, if the QoS flow is of the IP type, the packet filter sub-set may include an IP packet filter sub-set, and the IP packet filter sub-set may include sub-QoS flow packet mark information on the IP header of a packet. If the QoS flow is of the Ethernet type, the packet filter sub-set may include an Ethernet packet filter sub-set, and the Ethernet packet filter sub-set may include sub-QoS flow packet mark information on the header of a packet.

In some embodiments, if the QoS flow includes multiple sub-QoS flows, the QoS flow includes multiple sub-QoS rules corresponding to the multiple sub-QoS flows, and each sub-QoS rule may further include a corresponding sub-QoS rule precedence value. The third processing unit 2120 is further configured to match the uplink packet to be transmitted with the sub-QoS flow detection information in each sub-QoS rule in the order according to the sub-QoS rule precedence value; and encapsulate the uplink packet to be transmitted with the sub-QFI corresponding to the first matched sub-QoS flow detection information.

Figure 22:
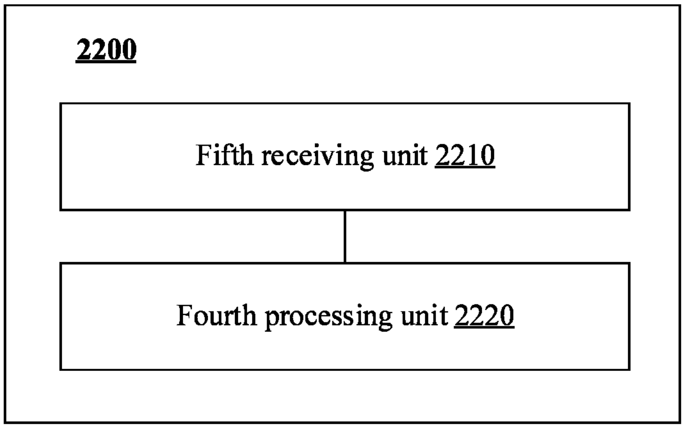
FIG. 22 is a schematic structural diagram of a User Plane Function (UPF) network element according to an embodiment of this disclosure.

A UPF network element 2200 provided in the embodiment of FIG. 22 may include a fifth receiving unit 2210 and a fourth processing unit 2220. The fifth receiving unit 2210 is configured to obtain UPF data processing instructions of the QoS flow from the SMF network element, and the UPF data processing instructions may include the sub-QFI of the sub-QoS flow in the QoS flow, and at least one of the sub-packet detection rules and the sub-QoS information of the sub-QoS flow. The fifth receiving unit 2210 is further configured to receive a packet to be forwarded. The fourth processing unit 2220 is configured to process the packet to be forwarded according to at least one of the sub-QFI, the sub-packet detection rules, and the sub-QoS information.

In some embodiments, when the UPF network element is an anchor UPF network element, and the UPF data processing instructions include the sub-packet detection rules, the sub-packet detection rules may include the sub-QoS flow detection information, and the packet to be forwarded may include a downlink packet to be forwarded. The fourth processing unit 2220 is further configured to encapsulate the downlink packet to be forwarded with the sub-QFI if it is determined that the packet to be forwarded matches the sub-QoS flow detection information in the sub-packet detection rules. The UPF network element 2200 may further include a transmitting unit configured to transmit the downlink packet to be forwarded encapsulated with the sub-QFI to a network device or an intermediate UPF network element.

In some embodiments, when the UPF data processing instructions include sub-QoS information, the packet to be forwarded may include an uplink packet to be forwarded. The fourth processing unit 2220 is configured to process the uplink packet to be forwarded according to the sub-QoS information if the uplink packet to be forwarded matches the sub-QFI.

Figure 23:
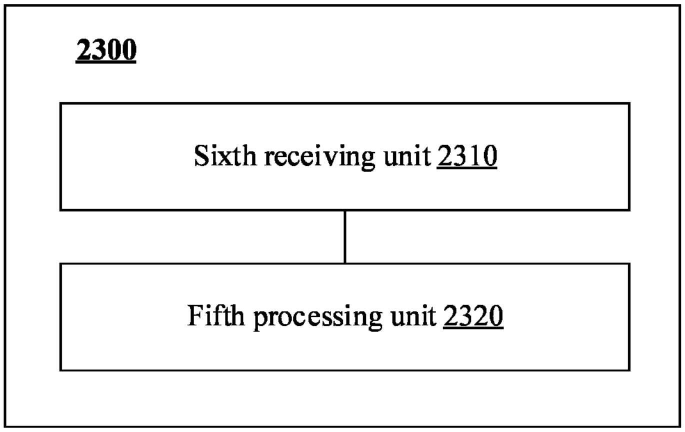
FIG. 23 is a schematic structural diagram of a network device according to an embodiment of this disclosure.

A network device 2300 provided in the embodiment of FIG. 23 may include a sixth receiving unit 2310 and a fifth processing unit 2320. The sixth receiving unit 2310 is configured to obtain a sub-QFI and a sub-QoS profile of a sub-QoS flow in a QoS flow, and the sub-QoS profile may include sub-QoS information of the sub-QoS flow. The sixth receiving unit 2310 is further configured to receive a packet to be forwarded. The fifth processing unit 2320 is configured to determine whether the packet to be forwarded matches the sub-QFI. The fifth processing unit 2320 is further configured to process the packet to be forwarded according to the sub-QoS information in the sub-QoS profile.

Figure 24:
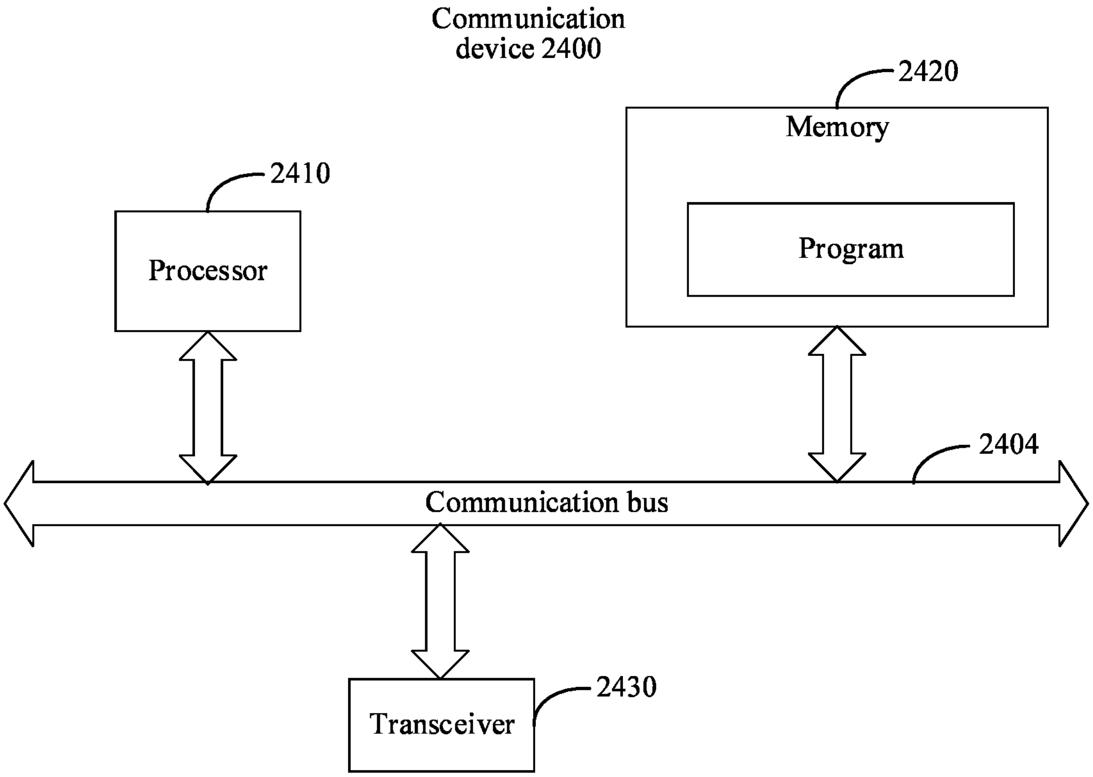
FIG. 24 is a schematic structural diagram of a communication device according to an embodiment of this disclosure.

FIG. 24 schematically illustrates a structural diagram of a communication device 2400 according to an embodiment of this disclosure. The communication device may be a terminal such as UE, or a network device such as a base station, and may also be at least one of a PCF network element, an NEF network element, an AF network element, an AMF network element, an SMF network element, and a UPF network element. The communication device 2400 shown in FIG. 24 includes a processor 2410, and the processor 2410 may call and run a computer program from memory to implement the methods in the embodiments of this disclosure.

In some embodiments, as shown in FIG. 24, the communication device 2400 may further include memory 2420. The processor 2410 may call and run a computer program from the memory 2420 to implement the methods in the embodiments of this disclosure. The memory 2420 may be a separate device independent of the processor 2410, or may be integrated in the processor 2410.

In some embodiments, as shown in FIG. 24, the communication device 2400 may further include a transceiver 2430, and the processor 2410 may control the transceiver 2430 to communicate with other devices, for example, transmit information or data to or receive information or data from other devices. The transceiver 2430 may include a transmitter and a receiver. The transceiver 2430 may further include one or more antennas.

In some embodiments, the communication device 2400 may be any one of various network elements in the embodiments of this disclosure, and the communication device 2400 may implement the corresponding processes implemented by the network elements in the methods of the embodiments of this disclosure, which will not be elaborated here for brevity.

In some embodiments, the communication device 2400 may be the network devices in the embodiments of this disclosure, and the communication device 2400 may implement the corresponding processes implemented by the network devices in the methods of the embodiments of this disclosure, which will not be elaborated here for brevity.

In some embodiments, the communication device 2400 may be the mobile terminals/terminals in the embodiments of this disclosure, and the communication device 2400 may implement the corresponding processes implemented by the mobile terminals/terminals in the methods of the embodiments of this disclosure, which will not be elaborated here for brevity.

It is to be understood that the processor in the embodiments of this disclosure may be an integrated circuit chip capable of processing signals. In an implementation process, the steps of the above method embodiments may be implemented by an integrated logic circuit of hardware in the processor or instructions in the form of software.

The term "unit" (and other similar terms such as module, submodule, etc.) refers to computing software, firmware, hardware, and/or various combinations thereof. At a minimum, however, units are not to be interpreted as software that is not implemented on hardware, firmware, or recorded on a non-transitory processor readable recordable storage medium. Indeed "unit" is to be interpreted to include at least some physical, non-transitory hardware such as a part of a processor, circuitry, or computer. Two different units can share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

The processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components, which may implement or perform the methods, steps, and logic block diagrams disclosed in the embodiments of this disclosure. The general-purpose processor may be a microprocessor, or the processor may be any conventional processor or the like. The steps of the methods disclosed with reference to the embodiments of this disclosure may be directly performed and completed by a hardware decoding processor, or may be performed and completed by a combination of hardware and software modules in a decoding processor. The software module may be stored in a storage medium mature in the art, e.g., Random Access Memory (RAM), flash memory, read-only memory (ROM), programmable ROM, electrically erasable programmable memory, register, and the like. The storage medium is located in the memory. The processor reads information from the memory and completes the steps of the above methods in combination with hardware thereof.

It may be understood that the memory in the embodiments of this disclosure may be volatile memory or non-volatile memory, or a combination of both. The non-volatile memory may be Read-Only Memory (ROM), Programmable ROM (PROM), Erasable PROM (EPROM), Electrically EPROM (EEPROM), or flash memory. The volatile memory may be Random Access Memory (RAM) used as an external cache. Through illustrative but not limited description, RAMs in many forms, e.g., Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM), are available. The memory of the systems and methods described herein is intended to include but not limited to these and any other suitable types of memory. It is to be understood that the above memory is illustrative but not restrictive.

An embodiment of this disclosure further provides a computer-readable storage medium for storing a computer program.

In some embodiments, the computer-readable storage medium may be applied to the network devices in the embodiments of this disclosure, and the computer program enables the computer to perform the corresponding processes implemented by the network devices in the methods of the embodiments of this disclosure, which will not be elaborated here for brevity.

In some embodiments, the computer-readable storage medium may be applied to the network elements in the embodiments of this disclosure, and the computer program enables the computer to perform the corresponding processes implemented by the network elements in the methods of the embodiments of this disclosure, which will not be elaborated here for brevity.

In some embodiments, the computer-readable storage medium may be applied to the mobile terminals/terminals in the embodiments of this disclosure, and the computer program enables the computer to perform the corresponding processes implemented by the mobile terminals/terminals in the methods of the embodiments of this disclosure, which will not be elaborated here for brevity.

An embodiment of this disclosure further provides a computer program product, including computer program instructions.

In some embodiments, the computer program product may be applied to the network devices in the embodiments of this disclosure, and the computer program instructions enable the computer to perform the corresponding processes implemented by the network devices in the methods of the embodiments of this disclosure, which will not be elaborated here for brevity.

In some embodiments, the computer program product may be applied to the network elements in the embodiments of this disclosure, and the computer program instructions enable the computer to perform the corresponding processes implemented by the network elements in the methods of the embodiments of this disclosure, which will not be elaborated here for brevity.

In some embodiments, the computer program product may be applied to the mobile terminals/terminals in the embodiments of this disclosure, and the computer program instructions enable the computer to perform the corresponding processes implemented by the mobile terminals/terminals in the methods of the embodiments of this disclosure, which will not be elaborated here for brevity.

An embodiment of this disclosure further provides a computer program.

In some embodiments, the computer program may be applied to the network devices in the embodiments of this disclosure, and the computer program, when run on a computer, enables the computer to perform the corresponding processes implemented by the network devices in the methods of the embodiments of this disclosure, which will not be elaborated here for brevity.

In some embodiments, the computer program may be applied to the network elements in the embodiments of this disclosure, and the computer program, when run on a computer, enables the computer to perform the corresponding processes implemented by the network elements in the methods of the embodiments of this disclosure, which will not be elaborated here for brevity.

In some embodiments, the computer program may be applied to the mobile terminals/terminals in the embodiments of this disclosure, and the computer program, when run on a computer, enables the computer to perform the corresponding processes implemented by the mobile terminals/terminals in the methods of the embodiments of this disclosure, which will not be elaborated here for brevity.

Those of ordinary skill in the art may realize that units and algorithm steps of each example described with reference to the embodiments disclosed herein can be implemented in electronic hardware, or a combination of computer software and electronic hardware. Whether these functions are performed in hardware or software depends on the specific application and design constraint of the technical solution. Those skilled in the art may implement the described functions using different methods for each particular application, but such implementation is not to be considered beyond the scope of this disclosure.

Those skilled in the art may clearly understand that, for the convenience and brevity of description, the specific working process of systems, apparatuses, and units described above may be obtained with reference to the corresponding process in the foregoing method embodiments, which will not be elaborated here.

In some embodiments provided in this disclosure, it is to be understood that the disclosed systems, apparatuses, and methods may be implemented in other manners. For example, the described apparatus embodiments are merely schematic. For example, the unit division is merely a logical function division and may be in other division manners in actual implementation. For example, a plurality of units or components may be combined or integrated into another system, or some features may be ignored or not performed.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this disclosure may be integrated in one processing unit, or the units may be physically separated, or two or more units may be integrated in one unit.

If implemented in the form of software functional units and sold or used as an independent product, the functions may also be stored in a computer-readable storage medium. Based on such an understanding, the technical solutions of this disclosure, or the part contributing to the related art, or part of the technical solutions essentially may be implemented in the form of a software product, which is stored in a storage medium and includes several instructions for enabling a computer device (e.g., a personal computer, a server, a network device, or the like) to perform all or some of the steps of the methods described in the embodiments of this disclosure. The foregoing storage medium includes: USB flash drives, removable hard discs, Read-Only Memory (ROM), Random Access Memory (RAM), magnetic discs, or optical discs and any other media for storing program code.

The foregoing descriptions are merely specific implementations of this disclosure, but are not intended to limit the protection scope of this disclosure. Any variation or replacement readily figured out by those skilled in the art within the technical scope disclosed in this disclosure shall fall within the protection scope of this disclosure. Therefore, the protection scope of this disclosure shall be subject to the protection scope of the claims.

What is claimed is:

1. A packet transmission method, performed by an Application Function (AF) network element, and comprising:

transmitting Quality of Service (QoS) request information to a Policy Control Function (PCF) network element in a request message, the QoS request information comprising sub-QoS flow detection information and sub-QoS information of a sub-QoS flow in a QoS flow, the sub-QoS flow detection information comprising at least one of a packet size of the sub-QoS flow or sub-QoS flow packet mark information present in a header of a packet of the sub-QoS flow; and receiving a response message to the request message, the response message comprising indication information on whether the request message is approved, the QoS request information being for indicating the PCF network element to generate policy and charging control (PCC) rules for the sub-QoS flow upon approval of the request message, and the PCC rules for the sub-QoS flow comprising the sub-QoS flow detection information and the sub-QoS information.

2. The method according to claim 1, wherein the sub-QoS flow detection information comprises packets of the sub-QoS flow or sub-QoS flow packet mark information.

3. The method according to claim 1, wherein the sub-QoS information comprises at least one of a scheduling precedence, a bit error rate, or transmission delay of target packets of the sub-QoS flow.

* * * * *